United States Patent
Grünewald et al.

(10) Patent No.: US 10,427,893 B2
(45) Date of Patent: Oct. 1, 2019

(54) HANDLING DEVICE AND BENDING INSTALLATION AND METHOD FOR BENDING A PART TO BE BENT

(71) Applicant: RAS REINHARDT MASCHINENBAU GMBH, Sindelfingen (DE)

(72) Inventors: Stephan Grünewald, Böblingen (DE); Jürgen Hentsch, Weil der Stadt (DE); Joachim Köhler, Sindelfingen (DE); Jochen Willmann, Bondorf (DE)

(73) Assignee: RAS Reinhardt Maschinenbau GmbH, Sindelfingen (DE)

( * ) Notice: Subject to any disclaimer, the term of this patent is extended or adjusted under 35 U.S.C. 154(b) by 693 days.

(21) Appl. No.: 14/978,010

(22) Filed: Dec. 22, 2015

(65) Prior Publication Data

US 2016/0107847 A1    Apr. 21, 2016

Related U.S. Application Data

(63) Continuation of application No. PCT/EP2014/062733, filed on Jun. 17, 2014.

(30) Foreign Application Priority Data

Jun. 27, 2013    (DE) .................. 10 2013 106 764

(51) Int. Cl.
*B21D 43/00* (2006.01)
*B21D 5/04* (2006.01)
(Continued)

(52) U.S. Cl.
CPC ............. *B65G 47/902* (2013.01); *B21D 5/00* (2013.01); *B21D 5/04* (2013.01); *B21D 43/006* (2013.01); *B21D 43/105* (2013.01); *B65G 47/918* (2013.01)

(58) Field of Classification Search
CPC .... B21D 11/22; B21D 43/006; B21D 43/003; B21D 43/105; B21D 51/2692; B21D 5/00;
(Continued)

(56) References Cited

U.S. PATENT DOCUMENTS

| 7,383,715 B2 * | 6/2008 | Kutschker ............ B21D 43/105 |
| | | 72/420 |
| 2002/0152001 A1* | 10/2002 | Knipp .................. G06Q 10/087 |
| | | 700/100 |
| 2013/0160508 A1 | 6/2013 | Fischereder et al. |

FOREIGN PATENT DOCUMENTS

DE    10 2004 048 036 A1    4/2006
EP        0 354 559 A1    2/1990
(Continued)

*Primary Examiner* — Pradeep C Battula
(74) *Attorney, Agent, or Firm* — Reinhart Boerner Van Deuren P.C.

(57) ABSTRACT

A handling device is provided. The handling device has a holding unit which has at least one holding element with which the part to be bent which is to be received and is arranged on a loading surface can be gripped on one of its flat sides by forces acting in a pulling manner on one side of the flat side at a plurality of successive locations in the longitudinal direction, that the holding unit for its part can be pivoted relative to a pivoting carrier unit about a first pivot axis parallel to the longitudinal direction, that the pivoting carrier unit can be pivoted relative to a pivoting carrier base about a second pivot axis which extends parallel to the first pivot axis, that the pivoting carrier base can be moved by means of a carrier base moving unit in a direction transverse to the second pivot axis.

41 Claims, 22 Drawing Sheets

(51) Int. Cl.
*B21D 43/10* (2006.01)
*B65G 47/90* (2006.01)
*B21D 5/00* (2006.01)
*B65G 47/91* (2006.01)

(58) Field of Classification Search
CPC ...... B21D 5/04; B65G 47/914; B65G 47/918; B65G 47/902
See application file for complete search history.

(56) References Cited

FOREIGN PATENT DOCUMENTS

| | | |
|---|---|---|
| EP | 0 497 780 B1 | 10/1993 |
| EP | 0 497 778 B2 | 2/1996 |
| EP | 0 742 054 A1 | 11/1996 |
| EP | 0 742 054 B1 | 11/2001 |
| EP | 1 181 118 B1 | 12/2004 |
| EP | 1 064 108 B1 | 3/2005 |
| JP | 10-34241 A | 2/1998 |
| WO | WO 2012/016252 A1 | 2/2012 |
| WO | WO-2012063710 A1 * | 5/2012 ............... B21D 5/02 |

* cited by examiner

HANDLING DEVICE AND BENDING INSTALLATION AND METHOD FOR BENDING A PART TO BE BENT

CROSS REFERENCE TO RELATED PATENT APPLICATION

This patent application is a continuation of International application No. PCT/EP2014/062733 filed Jun. 17, 2014, which claims priority to German application No. 10 2013 106 764.6 filed Jun. 27, 2013, the teachings and disclosure of which are hereby incorporated in their entirety by reference thereto.

BACKGROUND OF THE INVENTION

The invention relates to a handling device for inserting parts to be bent into a bending device for the bending thereof about at least one bending edge, as well as a bending installation comprising a handling device of this type and the bending device.

Handling devices and bending installations having handling devices of this type are known from the prior art, wherein in these known solutions, large in particular elongated parts to be bent cannot be inserted with the required precision into the bending device.

The object of the invention is therefore to achieve a handling device and a bending installation having a handling device of this type, wherein parts to be bent can be inserted into the bending device with as high precision as possible, and bent.

SUMMARY OF THE INVENTION

This object is solved according to the invention, for a handling device of the above-described type, in that the handling device has a holding unit which is formed to be elongate in a longitudinal direction and has at least one holding element with which the part to be bent which is to be received and is arranged on a loading surface is grippable on one of its flat sides by forces acting in a pulling manner on one side of the flat side at a plurality of successive locations in the longitudinal direction, that the holding unit for its part is pivotable relative to a pivoting carrier unit about a first pivot axis parallel to the longitudinal direction, that the pivoting carrier unit is pivotable relative to a pivoting carrier base about a second pivot axis which extends parallel to the first pivot axis, that the pivoting carrier base is movable by means of a carrier base moving unit in a direction transverse to the second pivot axis, and that, with the handling device, the part to be bent can be moved between a receiving position for the part to be bent on the loading surface and a bending device insertion position for the part to be bent on the bending device.

The advantage of the solution according to the invention can be seen in that the holding unit is thus configured to be elongate in a longitudinal direction, opening up the possibility to grip the part to be bent at a plurality of successive locations in the longitudinal direction by means of forces acting in a pulling manner on one side of the flat side, and thus to handle in particular elongate parts to be bent precisely and kinematically easily, and to position them precisely in the insertion position for the part to be bent in the bending device for bending.

It is particularly advantageous here that the holding unit supports the part to be bent, which is to be received, on the flat side at a plurality of successive locations in the longitudinal direction.

The advantage of this solution can in particular be seen in that, by the multiple support of the part to be bent at a plurality of successive locations in the longitudinal direction, the possibility exists of receiving the part to be bent exactly orientated, of holding it exactly and of guiding it exactly, in at least one direction, for example parallel to the longitudinal direction.

In particular, it is more advantageously provided that the holding unit also supports the part to be bent, which is to be received, on the flat side at a plurality of successive locations in the longitudinal direction, for example near or at the locations at which forces acting in a pulling manner on the flat side are present.

It is particularly advantageous if the holding unit has a contact surface extending in the form of a strip in the longitudinal direction, since support of the part to be bent at a plurality of successive locations in the longitudinal direction is easily possible by a contact surface of this type.

A contact surface constructed in the form of a strip should be understood as meaning a surface whose extent in the longitudinal direction is at least ten times, preferably twenty times, particularly preferably fifty times its extent transverse to the longitudinal direction.

The contact surface can be formed by surface segments interrupted in the longitudinal direction, in particular strip-shaped surface segments.

A favourable solution provides that the contact surface extends in the longitudinal direction as a connected strip-like surface, wherein this surface has a through opening at the locations at which the holding elements are provided.

That means that the contact surface is in the position to support the part to be bent continuously across its entire strip-like extent in the longitudinal direction.

Furthermore, it is preferably provided that the holding unit has a contact surface which is arranged to be applied to the flat side of the part to be bent, which is to be received, the contact surface having a spacing from the first pivot axis which is a fraction of the spacing of the first pivot axis from the second pivot axis.

This solution offers the advantage that a favourable handling of the part to be bent abutting the contact surface is possible, by means of the small spacing of the contact surface from the first pivot axis relative to the spacing of the first pivot axis from the second pivot axis, which is due to the confined spatial conditions in the bending device in the region of the clamping tools and the geometric parameters of the part to be bent arising from the bending.

It is particularly favourable if the spacing of the contact surface from the first pivot axis is less than one third, or more preferably less than one fifth of the spacing of the first pivot axis from the second pivot axis.

Furthermore, it is preferably provided that the holding unit is pivotable about the first pivot axis such that a contact surface thereof is orientable in two positions pivoted at approximately 180° to one another in each case parallel to a central plane of the pivoting carrier unit, such that the possibility exists of positioning the part to be bent on one side or the other of the central plane of the pivoting carrier unit, depending on the bending to be carried out.

Furthermore, it is preferably provided that the holding unit is positionable within a predetermined angle range in any rotational position about the first pivot axis in a position-controlled or position-regulated manner.

In particular, it is expedient here if the holding unit is positionable, by means of a machine control, within the predetermined pivot region in any rotational position in a position-controlled or position-regulated manner about the first pivot axis relative to the pivoting carrier unit in a position-controlled or position-regulated manner.

No further details have been given hitherto with regard to the holding unit and the holding elements arranged thereon for gripping the part to be bent.

Thus it could be provided that the holding unit has a single holding element which extends over the holding unit in the longitudinal direction.

However, it is particularly favourable if the holding unit has a plurality of holding elements arranged successively in the longitudinal direction, wherein each of the holding elements is in the position to act on one flat side of the part to be bent with a force acting in a pulling manner.

This solution has the advantage that the action of force on the part to be bent is thereby definable.

In particular, it is provided for this purpose that the holding elements are individually activatable or deactivatable, such that, by activating the appropriate number of holding elements, the action of force on the part to be bent can also be determined and adapted to its extent.

In particular, the possibility exists of constructing the holding unit with an extent in the longitudinal direction provided for the maximum possible parts to be bent and also of arranging the corresponding number of holding elements, but then of adapting the number of active holding elements to the actual extent of the part to be bent in the longitudinal direction, and in particular of deactivating the holding elements which are located outside of the flat side of the part to be bent, which is to be gripped.

In principle, it would be conceivable to work with different forces acting in a pulling manner on the flat side.

Thus, in one solution, it is provided that a holding element acts on the flat side of the part to be bent with magnetic attraction forces.

Another advantageous solution provides that a holding element acts on the flat side of the part to be bent with pneumatic suction forces.

Using pneumatic suction forces has the advantage here that these forces act regardless of the material of the part to be bent, such that it is not necessary for the material of the part to be bent to be magnetisable.

In particular, it is provided in this case that the holding element has at least one suction chamber, by means of which pneumatic suction forces can be generated.

The contact surface and the suction chamber could in principle be arranged independently of one another on the holding unit.

In particular, each suction chamber has here a suction chamber opening which is located within the contact surface, such that each suction chamber is surrounded by a portion of the contact surface.

With regard to the construction of the pivoting carrier unit, no further details have been given in connection with the present description of the solution according to the invention.

Thus, one advantageous solution provides that the pivoting carrier unit has at least two pivot arms extending to the first pivot axis.

Expediently, the pivot arms here are rigidly connected to one another, such that a stable guiding of the first pivot axis relative to the second pivot axis is possible.

It is particularly favourable if the pivot arms are connected to one another by an insert extending therebetween, since an insert of this type improves the stabilisation of the pivot arms relative to one another.

In particular, it is provided here that the insert is constructed as an inherently rigid and in particular torsionally stiff frame, and thus also rigidly connects the pivot arms to one another due to its inherent rigidity.

In the case where a frame of this type is used, it is particularly expedient if the holding unit is pivotally mounted on the insert about the first pivot axis by means of a plurality of pivot bearing points arranged successively in the longitudinal direction, such that, by the multiple pivotal mounting of the holding unit, the holding unit itself can also be stabilised in its orientation in the longitudinal direction by the insert, in order to ensure as precise and flexure-free an orientation of the holding unit as possible, and thus a correspondingly flexure-free orientation of the part to be bent held by the holding unit.

No further details have been given hitherto with regard to the movement of the pivoting carrier base by means of the carrier base moving device.

Thus, one advantageous solution provides that the movement of the pivoting carrier base can be carried out in a position-controlled or position-regulated manner by means of the carrier base moving device, using a machine control, such that, with this movement, an exact positioning of the holding unit and therefore of the part to be bent is also possible relative to the bending device.

For this purpose, it is preferably provided that at least one movement with a component in the direction parallel to an insertion plane of the bending device can be carried out by means of the carrier base moving device, in order to have the possibility of moving the part to be bent parallel to the insertion plane when inserting into the bending device.

Furthermore, it is preferably provided that at least one movement with a component in the direction transverse to an insertion plane of the bending device can be carried out by means of the carrier base moving device, in order to be able to adapt the position of the part to be bent relative to the insertion plane when inserting into the bending device.

Expediently, it is provided here that the carrier base moving device is constructed such that therewith at least one linear movement can be carried out transversely to the bending edge.

The execution of these movements could also occur for example by means of a device comprising at least two pivot axes, such as for example a device having at least one articulated arm, wherein these pivot axes run for example parallel to the first and second pivot axis.

For reasons of exact positioning, it has however proved advantageous if the carrier base moving device comprises at least one linear guide having a guide carriage, wherein for example the linear guide having the guide carriage enables movement with the component running parallel to the insertion plane.

Furthermore, a further advantageous solution provides that the carrier base moving device comprises at least one further linear guide having a carriage unit, wherein the further linear guide having the carriage unit preferably enables movement with the component transverse to the insertion plane.

A further advantageous solution of the handling device provides that the carrier base moving device comprises a rotation axis running transversely to the second pivot axis, about which the pivoting carrier base can be rotated.

A rotation axis of this type which runs transversely to the second pivot axis enables in particular an orientation of the pivoting carrier base on the one hand relative to the part to be bent for receiving it in the bending receiving position, and on the other hand relative to the bending device for inserting it in the bending insertion position.

It is particularly favourable here if the rotation axis runs perpendicular to the insertion plane, since in this case the possibility then exists of exactly orientating the part to be bent relative to a bending edge.

The rotation axis can however also be used to perform a rotational pivoting movement which can be used for transferring the part to be bent from the bending receiving position to the bending insertion position.

In this case, the rotation axis serves on the one hand to orientate the holding unit relative to the part to be bent in the bending receiving position, and on the other hand to orientate the received part to be bent in the bending insertion position, and to perform a pivot movement in order to get from the bending receiving position to the bending insertion position.

No further details have been given hitherto with regard to the run of the insertion plane.

Thus, one advantageous solution provides that the insertion plane runs parallel to a clamping surface of the clamping tools.

The above-mentioned object is further achieved according to the invention by a bending installation comprising a bending device, a loading device and a handling device, in that, by means of the handling device, the part to be bent is received by the loading device and the received part to be bent is inserted multiple times in the bending device in order to bend a portion of the part to be bent, and in that the handling device is constructed according to any of the preceding features.

The advantage of the bending installation according to the invention is thus also given, in that, with this bending installation, bending of an in particular elongated part to be bent is possible with high precision.

No further details have been given here with regard to the construction of the bending device.

Thus, one advantageous solution provides that the bending device has two clamping tools as well as a bending tool which can be moved relative to the clamping tools for the purpose of bending.

In particular, it is provided here that bending of the portions of the part to be bent is possible in two opposing bending directions, by means of the bending device.

No further details have been given here with regard to the construction of the clamping tools.

Preferably, the clamping tools are constructed here such that they define a clamping plane with their clamping surfaces.

A particularly advantageous and expedient construction of the bending device provides that the bending device is constructed as a pivoting bending device, since pivoting bending devices are robust and stable, and work precisely.

In this case, the bending tool of the pivoting bending device is expediently held on a bending beam which can be pivoted about the pivot axis.

No further details have been given in connection with the construction of the loading surface.

Thus, one advantageous solution provides that the loading surface is formed by a feed table.

In order to be able to exactly position the part to be bent on the feed table for reception by the handling device, it is preferably provided that the feed table has stop elements for a blank part to be bent to be fed.

With these stop elements, the possibility exists of positioning the blank part to be bent on the feed table exactly in the receiving position for the part to be bent.

In particular, in order to be able to dispose the part to be bent on the stop elements, slider inserts are preferably provided, with which a movement of the part to be bent towards the stop elements is possible.

For the handling of the part to be bent, it is advantageous if the part to be bent can be gripped in a defined position in the receiving position for the part to be bent on the loading surface, such that the handling can take place without additional position detection.

The gripping of the part to be bent in a defined position can be facilitated by depositing the part to be bent and measuring it on the feed table.

Alternatively to this, it is provided to move the part to be bent into a position defined at least in two directions, which position represents the receiving position for the part to be bent, and to receive the part to be bent in this position.

Here, the not exactly defined spatial direction for example runs for example in the longitudinal direction of the part to be bent and, in the insertion position for the part to be bent, parallel to the bend lines to be formed, such that an exact positioning in this spatial direction is not necessary in this case.

It is however also conceivable in the context of the invention to exactly position the part to be bent in the insertion position for the part to be bent in all three spatial directions.

Moreover, the invention relates to a method for bending a part to be bent in a bending device using an insertion device, in which, according to the invention, the part to be bent is received by means of the handling device and is successively inserted, fixed and bent in the bending device in different insertion positions for the part to be bent, and the finished part to be bent is subsequently moved out of the bending device and put down more advantageously by the handling device.

For the handling of the part to be bent, it is advantageously provided that the part to be bent is gripped in a defined position in a receiving position for the part to be bent, such that the handling can take place without additional position detection.

The gripping of the part to be bent in a defined position can take place by measuring the part to be bent either before or after reception thereof.

Alternatively to this, it is provided to bring the part to be bent into a position defined at least in two directions, which position represents the receiving position for the part to be bent, and to receive the part to be bent in this position.

Here, the not exactly defined spatial direction for example runs in the longitudinal direction of the part to be bent and in the insertion position for the part to be bent, such that it lies parallel to the bend lines to be formed, such that an exact positioning in this spatial direction is not necessary in this case.

It is also conceivable in the context of the invention to exactly position the part to be bent in the insertion position for the part to be bent in all three spatial directions or to detect its position.

It is in particular provided here that the part to be bent is gripped in a gripping region of the handling device, which gripping region constitutes a partial surface region of a flat side, the partial surface region being elongate in a longitudinal direction, and is fixed in this gripping region of the handling device.

It is possible here, for example, to release the part to be bent from the holding unit after the bending processes and then to grip it again in particular in the same place or in a different place.

It is however particularly favourable if the part to be bent is fixed in the gripping region by the handling device until the part to be bent, which has been bent multiple times, in particular bent to completion, in the bending device, is put down for removal.

In particular it is provided here that the part to be bent is bent in the bending device about bend lines running at an angle relative to one another or running parallel to one another.

Bending of the part to be bent about bend lines running parallel to one another enables in particular bending of the part to be bent to a shape which is open on at least one side or also bending to a shape which is open on at least two sides.

In the context of the solution according to the invention, it is possible to hold a part to be bent initially in a first gripping region and, after execution of a part of the provided bending processes, to hold it in a further gripping region, or optionally, after further bending processes, to hold it in the next gripping region.

Furthermore, it is for example provided that the part to be bent is received by the handling device in the gripping region forming a portion of a flat side and, in particular, is held in the gripping region during all the bending processes.

It is in particular provided here that the gripping region of the part to be bent is placed such that the bend lines to be subsequently bent are situated outside of the gripping region.

Preferably, insertion of the part to be bent in the insertion position for the part to be bent takes place by pivoting the holding unit about the first pivot axis, pivoting the pivoting carrier unit about the second pivot axis and moving the pivoting carrier base by means of the carrier base moving unit.

The movements of the part to be bent here are preferably controlled by a programmable machine control.

Further features and advantages of the invention will emerge from the following description and accompanying drawings of an embodiment of a bending installation according to the invention having a bending device, a handling device and a loading device.

DETAILED DESCRIPTION OF THE INVENTION

A bending installation indicated as a whole by 10 comprises a bending device indicated as a whole by 12, a handling device indicated as a whole by 14 and a loading device indicated as a whole by 16 for a part to be bent B, for example a flat piece of material or a preformed, for example pre-bent part.

Figure 1:
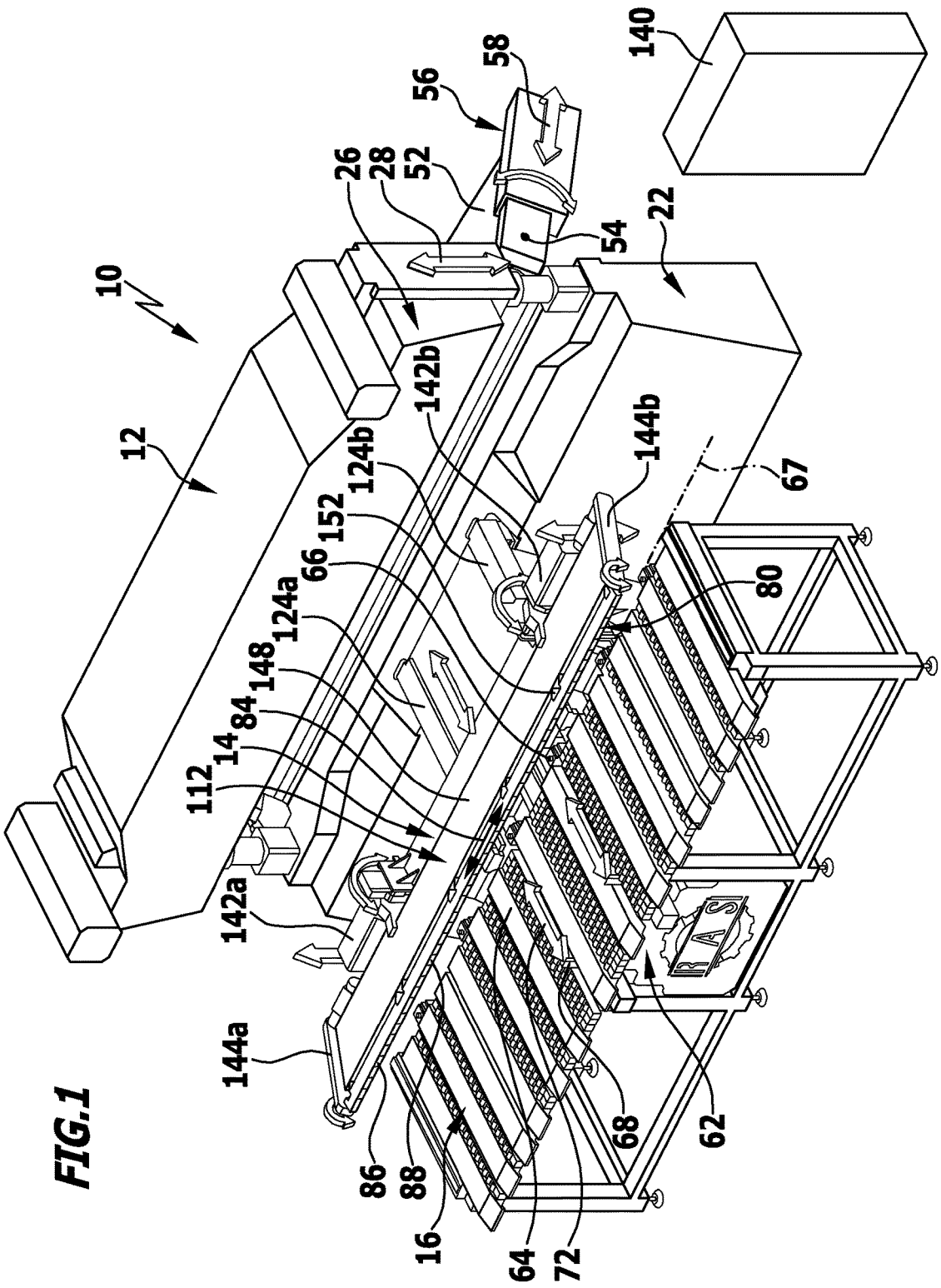
FIG. 1 is a perspective view of an embodiment of a bending installation according to the invention.
Figure 2:
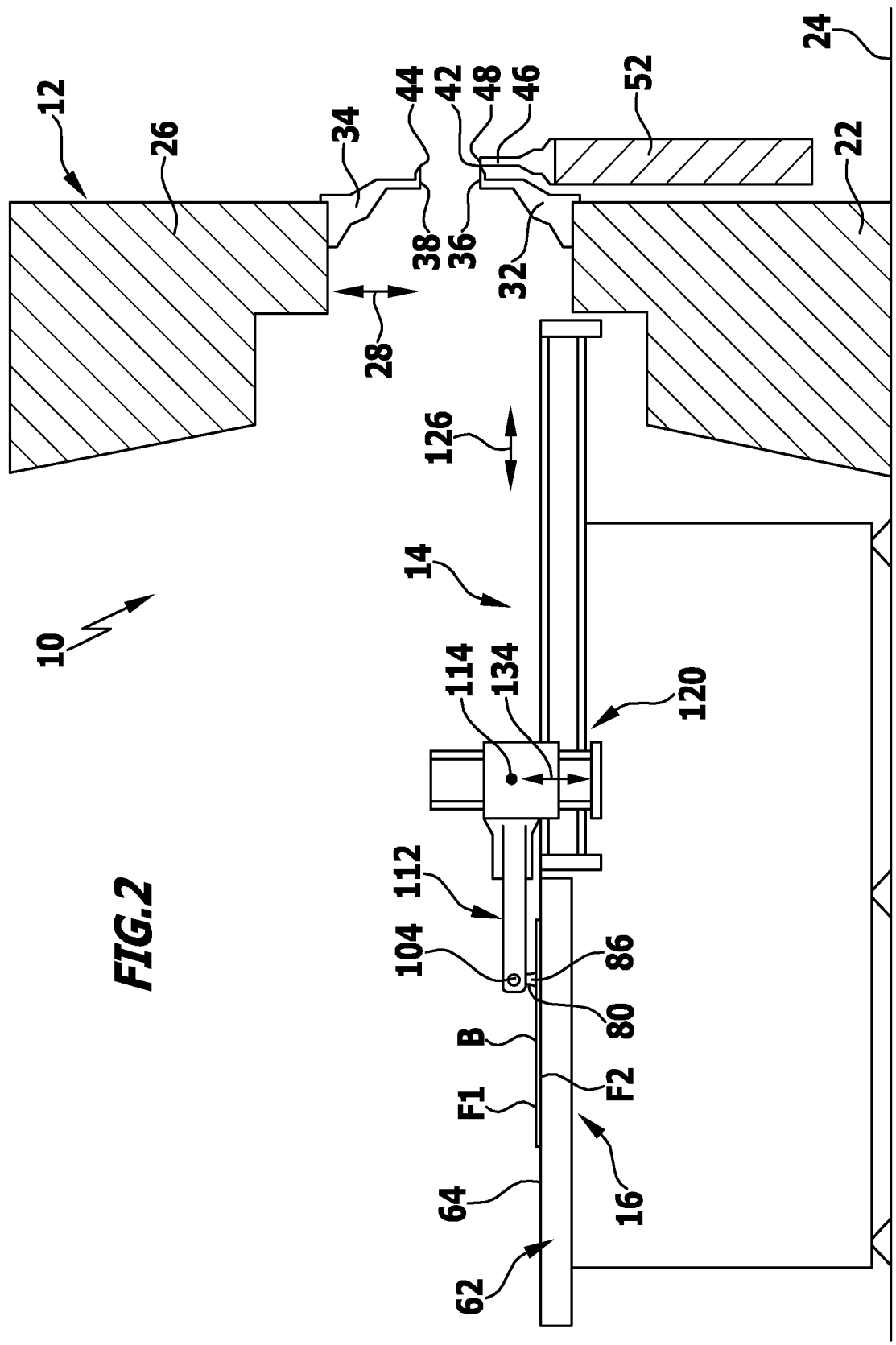
FIG. 2 is a side view of the embodiment of the bending installation according to the invention, in accordance with FIG. 1.
Figure 3:
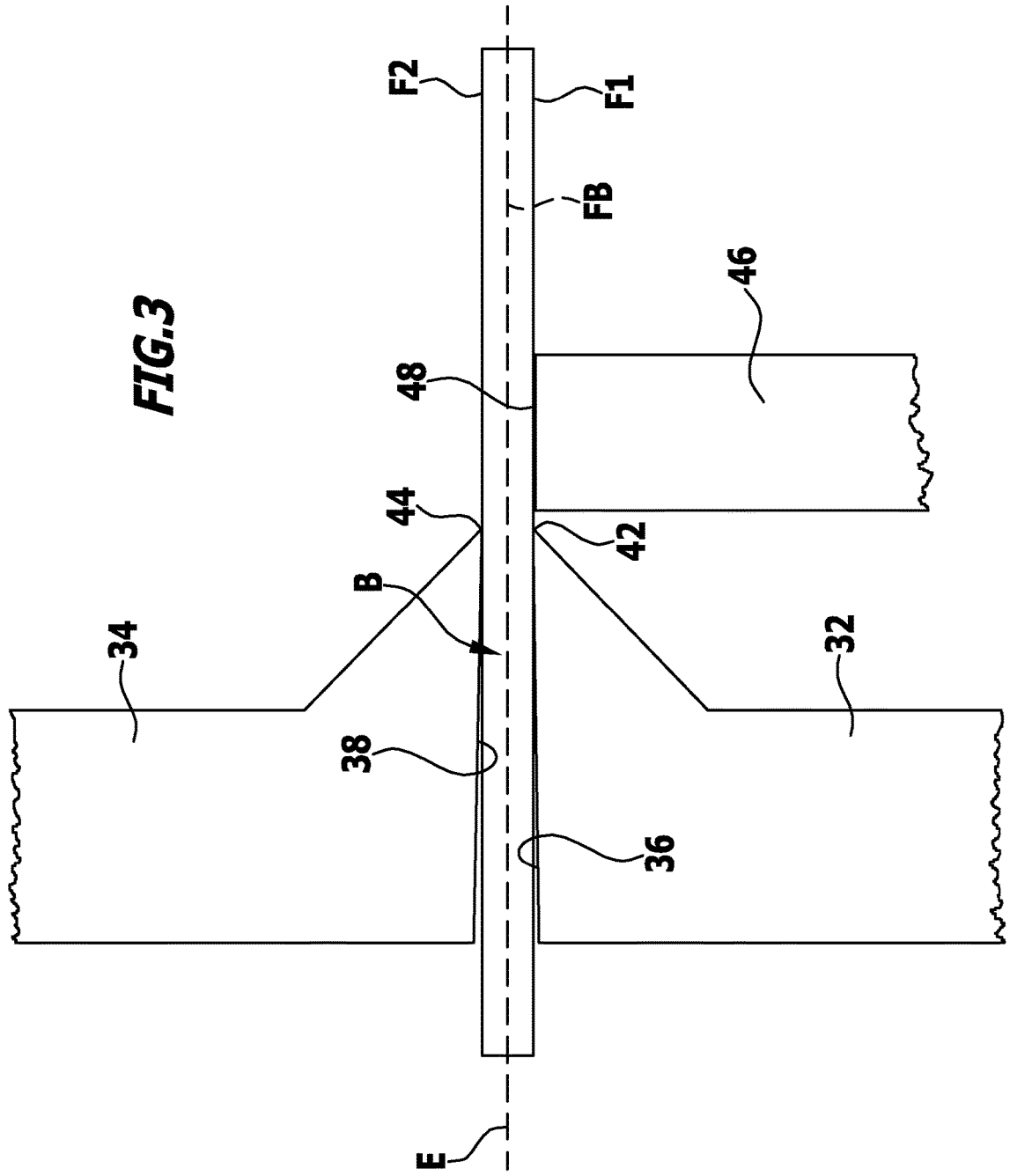
FIG. 3 is an enlarged view of a bending device of the bending installation according to the invention in the region of the clamping tools and of a bending tool.

The bending device comprises, as shown in FIGS. 1 to 3, a machine base lower part 22 which can be erected on a floor surface 24 for the bending installation 10 and which holds a lower clamping tool 32.

Opposite the lower clamping tool 32, an upper clamping tool 34 is provided which, for its part, is held by a machine base upper part 26, wherein the machine base upper part 26 is movable relative to the machine base lower part 22 in a direction of travel.

By movement in the direction of travel 28, the upper clamping tool 34 can be moved away from the lower clamping tool 32 or towards it, wherein, as shown in FIG. 3, the clamping tools 32, 34 have facing clamping surfaces 36 and 38 which run substantially parallel to a clamping plane E, such that thereby the part to be bent B constructed for example from a flat material can be acted upon and clamped both on a first flat side F1 and on a second flat side F2 by the clamping tools 32, 34 with the corresponding clamping surfaces 36 and 38, in order to fix the part to be bent B for bending.

Here, each of the clamping tools 32, 34 has a bending edge 42, 44 on a side remote from the handling device 14, about which bending edge bending of the portion FB projecting freely over the bending edges 42, 44 can occur, during bending of the part to be bent B.

The bending of the part to be bent B about one of the bending edges 42, 44 occurs by means of a bending tool indicated as a whole by 46 which can be disposed with a bending surface 48 either on the first flat side F1 or the second flat side F2 of the free-standing partial surface region FB of the part to be bent B, in order to bend it about the respective bending edge 44, 42 arranged opposite the bending surface 48.

For this purpose the bending tool 46 is held on a bending beam indicated as a whole by 52, which, as shown in FIG. 1, can be pivoted for example about a pivot axis 54 relative to the machine base lower part 22.

The bending beam 52 sits on bending beam carriers 56 which can be pivoted about the pivot axis 54 relative to the machine base lower part 22, which bending beam carriers enable furthermore an adjustable positioning of the bending beam 52 in the radial direction 58 relative to the pivot axis 54 and in particular also transverse to the radial direction 58, in order to be able to suitably position the bending beam 52 both for bending about the bending edge 42 and bending about the bending edge 44, and where appropriate to bypass the free-standing partial surface region FB.

For further details, a bending device of this type is described in EP 0 497 778 B2 and/or EP 0 497 780 B1, to which reference is made with regard to the movability of the bending tool.

An alternative bending device having the same bending possibilities is described in EP 1 064 108 B1, to which reference is also made.

As shown further in FIGS. 1 and 2, the loading device 16 comprises a feed table 62 which forms a loading surface 64 on which the part to be bent B can be placed.

Furthermore, stop elements 66 are provided on the feed table 62, against which stop elements the part to be bent B, which is to be placed on the loading surface 64, can be disposed, in order to position the part to be bent in a defined manner in at least two spatial directions, while a positioning in a spatial direction parallel to a stop line 67 defined by the stop elements 66 is undefined.

Finally, the feed table 62 comprises in addition slider inserts 68 which can be moved in a sliding direction 72 parallel to the loading surface 64, namely in the direction of the stop elements 66 or away from them, in order to be able to move a part to be bent B in the direction of the stop elements 66 and to dispose the part to be bent B thereon, by means of these slider inserts 68.

Thus, by means of the stop elements 66 and the slider inserts 68, a part to be bent B can be positioned in a defined manner in at least two spatial directions on the feed table in a support region indicated as a whole by 64 in a receiving position for the part to be bent.

The handling device 14 serves to transfer the part to be bent B from the receiving position for the part to be bent to an insertion position for the part to be bent in the bending device 12.

In order to receive a part to be bent B from the receiving position for the part to be bent on the feed table 62, the handling device 14 comprises a holding unit, indicated as a whole by 80, which, in the embodiment shown in FIG. 1, is constructed in the form of a holding rail 86 extending in a longitudinal direction 84, which holding rail has numerous holding elements 88 arranged successively in the longitudinal direction 84.

Figure 4:
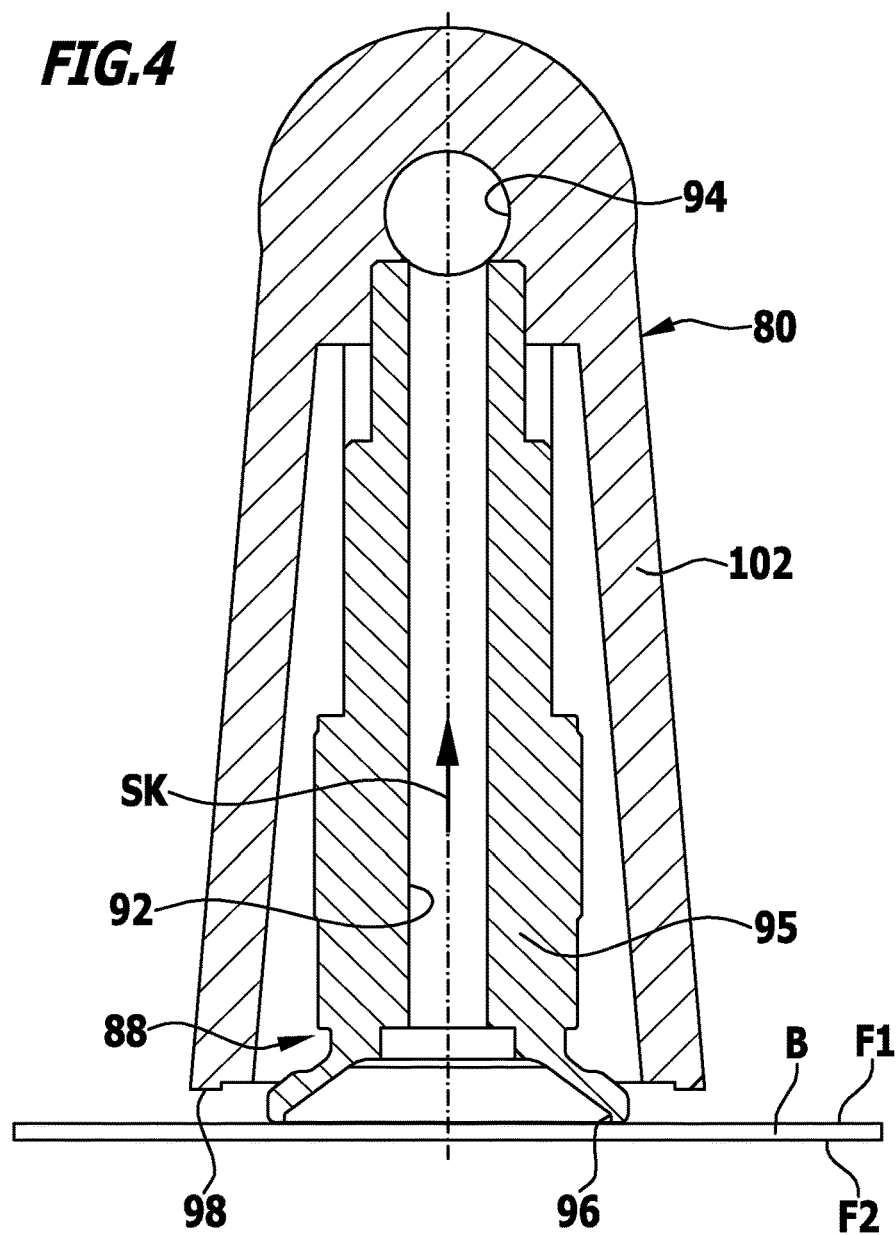
FIG. 4 is a cross section through a first version of a holding unit according to the invention for holding a part to be bent.
Figure 5:
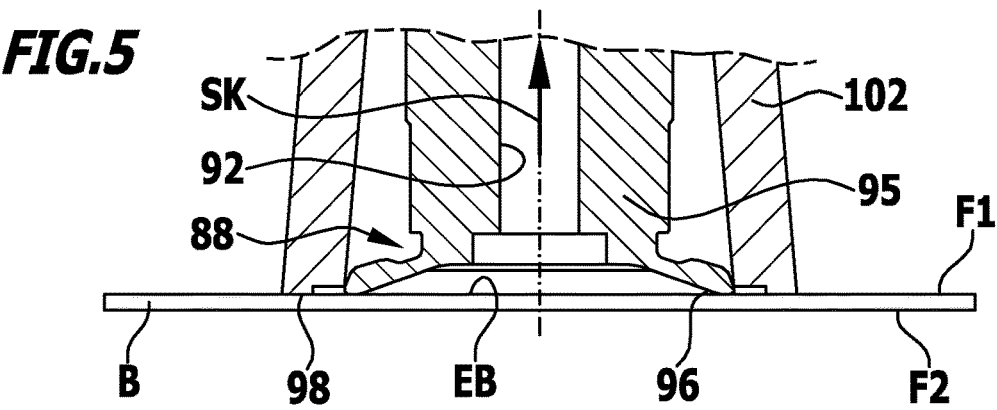
FIG. 5 is a cross section similar to FIG. 4 when holding the part to be bent and applying it against a contact surface.

Here, each of the holding elements 88, as shown in FIG. 4 and FIG. 5, is provided with a suction chamber 92 which can be brought into negative pressure with respect to the ambient pressure by means of a suction line 94.

Each suction chamber 92 has a suction chamber opening 96 constructed from resilient material as a suction head 95, such that the holding element 88 constructed in this way is attached on one of the flat sides F1, F2 of the part to be bent B by means of the suction head 95, in order to suck the corresponding flat side F in a strip-shaped partial surface region of the part to be bent B which extends parallel to the longitudinal direction 84 and is indicated as a gripping region EB.

For exact positioning, the respective holding element 88 further comprises in particular a contact surface 98 arranged around the respective suction chamber opening 96, the contact surface supporting the part to be bent B in the gripping region EB when the holding element 88 is attached on the flat side F1 of the part to be bent B, wherein, at the same time, the part to be bent B is sucked by a suction force SK acting perpendicular to the flat side F1 in the direction of the suction chamber 92, and is thus fixed on the contact surface 98.

Thus, each suction chamber 92 generates the suction force SK, such that, by means of the multiplicity of successive suction chambers 92 in the longitudinal direction 84, the force SK acts in each case on the flat side F of the part to be bent B at the location of the respective suction chamber 92, in order to draw the flat side F against the contact surface at this location.

Figure 6:
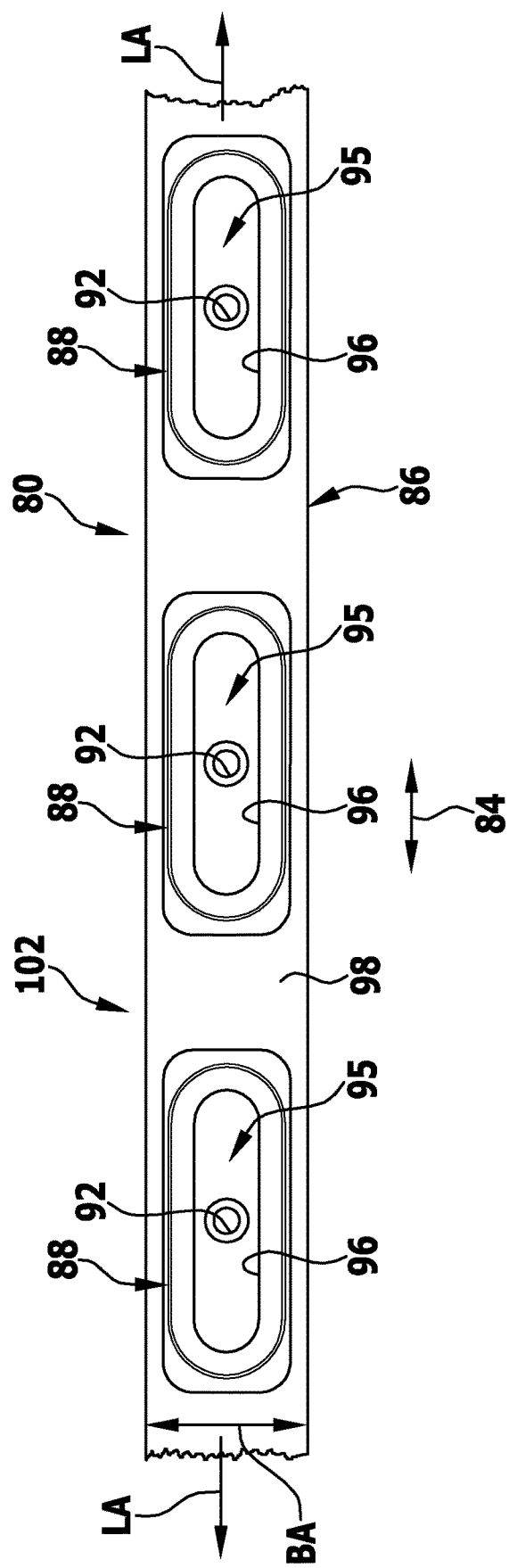
FIG. 6 is a plan view of a contact surface of the first version of the holding unit according to the invention.

As shown in FIG. 6, the individual suction heads 95 are arranged successively in the longitudinal direction 84 in a continuous suction chamber housing 102 which forms the holding rail 86 and incorporates the contact surface 98 in which the suction chamber openings 96 are located.

Altogether the contact surface 98 extends in the form of an elongate strip in the longitudinal direction 84, wherein the linear extent LA of the contact surface 98 is many times, preferably more than ten times, the width extent BA thereof.

Figure 7:
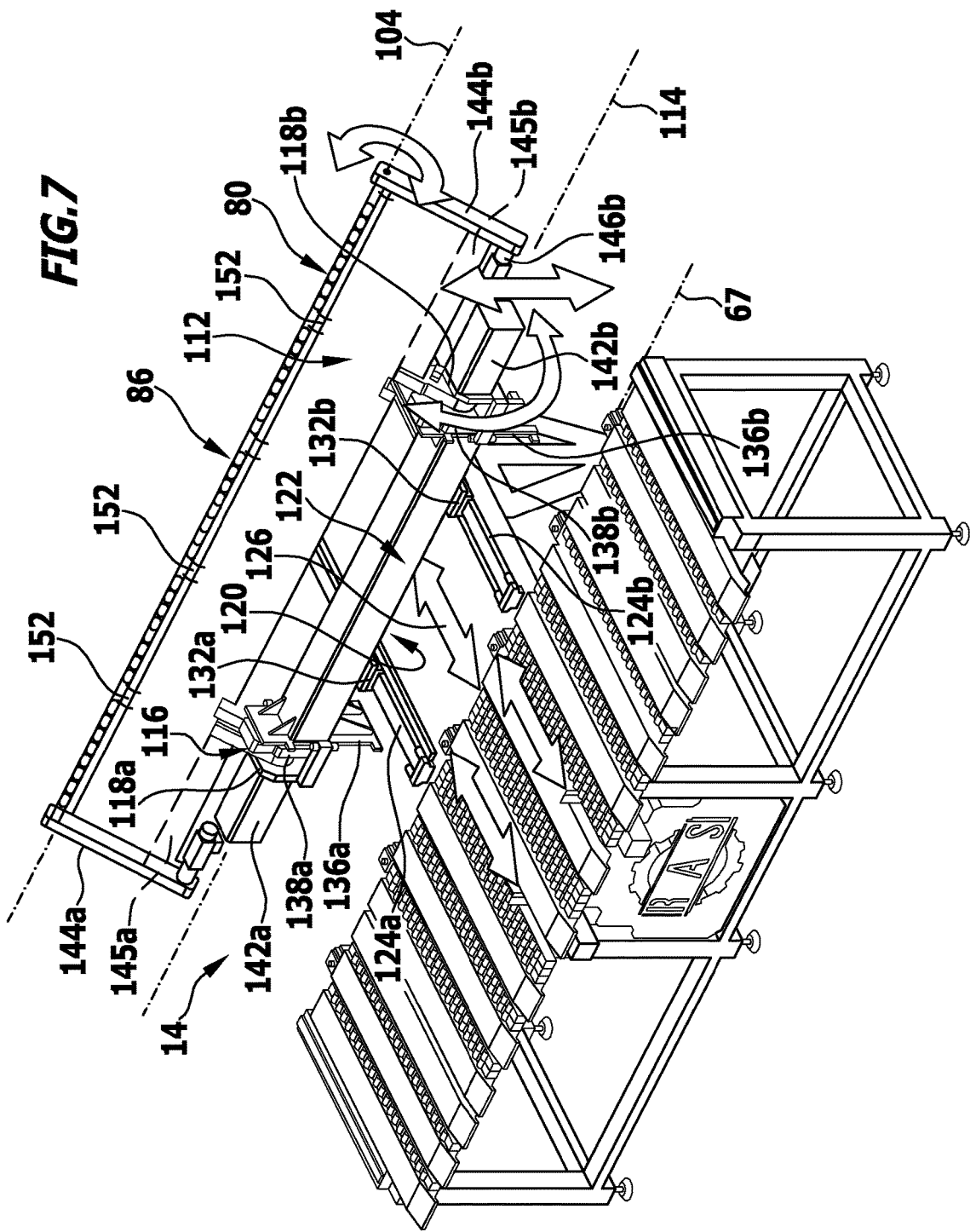
FIG. 7 is a perspective view in accordance with FIG. 1 of an insertion device according to the invention.
Figure 8:
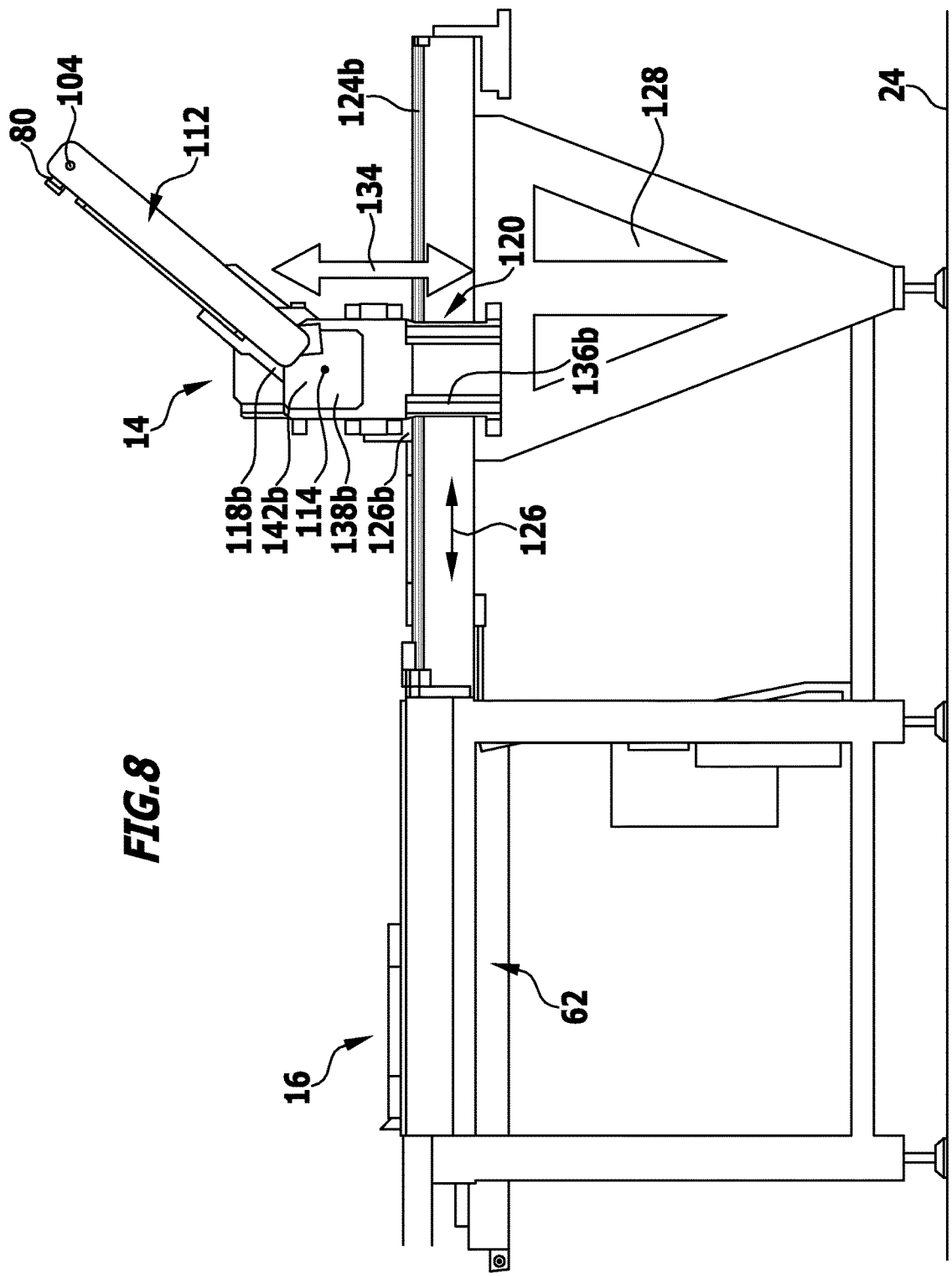
FIG. 8 is a side view of a first embodiment of a handling device according to the invention as a part of the bending installation according to the invention, in accordance with FIG. 1.

As shown further in FIGS. 1, 7 and 8, the holding unit 80 is held pivotally on a pivoting carrier unit indicated as a whole by 112 of the handling device 14 about a first pivot axis 104 which runs parallel to the longitudinal direction 84 of the holding unit 80, wherein the pivoting carrier unit 112 for its part is in turn pivotally mounted on a pivoting carrier base indicated as a whole by 116 of the handling device 14 about a second pivot axis 114. The pivoting carrier base 116, for its part, is movable between the loading device 16 and the bending device 12 by a carrier base moving unit indicated as a whole by 120.

The carrier base moving unit 120 is implemented in that the pivoting carrier base 116 is formed for example by two pivoting carrier base units 118a and 118b, which for their part are arranged on a base unit 122 which holds the whole pivoting carrier unit 112 with the holding unit 80.

The base unit 122 is furthermore, for its part, guided on two linear guides 124a and 124b running at a spacing from one another by means of guide carriages 132a, 132b of the carrier base moving unit 120 and thereby can be moved in a feed direction 126 between the loading device 16 and the bending device 12, in particular the clamping tools 32, 34, wherein the feed direction 126 preferably runs parallel to the clamping plane E which was explained in connection with the clamping tools 32, 34 in FIG. 3.

The linear guides 124a, 124b sit on a carrier frame 128 connected to the feed table 62, the carrier frame for its part being for example in turn supported on the floor surface 24.

The guide carriages 132a and 132b are movably guided on the linear guides 124a and 124b in the feed direction 126, which guide carriages hold the base unit 122 and with which the base unit 122 can be positioned accurately in the feed direction 126 in a position-controlled, in particular position-regulated, manner, for example by means of a computer-controlled linear axle drive with measuring system.

In the illustrated embodiment of the handling device 14, the pivoting carrier base units 118a, 118b can still additionally be moved relative to the base unit 122 in a height positioning direction 134 running transversely to the feed direction 126.

For this purpose, the base unit 122 in accordance with FIGS. 7 and 8 also comprises linear guides 136a, 136b running transversely to the linear guides 124a, 124b, on which linear guides 136a, 136b the carriage units 138a, 138b respectively holding the pivoting carrier base units 118a and 118b are guided in the height positioning direction 134 in a displaceable and exactly positionable manner.

Computer-controlled linear axle drives with measuring devices are also provided for this purpose.

The carrier base moving unit 120 thus enables a position-controlled or position-regulated positioning of the pivoting carrier base 116 in the feed direction 126 and the height positioning direction, controlled by means of a machine control 140.

Finally, the pivoting carrier base units 118a and 118b additionally comprise for their part pivot drives 142a, 142b with which the pivoting carrier unit 112 can be pivoted relative to the pivoting carrier base 116 by means of the machine control 140 about the second pivot axis 114 in a position-controlled or position-regulated manner.

The pivoting carrier unit 112 is constructed such that it has pivot arms 144a, 144b connected to drive arms 143a, 143b pivotally mounted by the pivot drives 142a, 142b about the second pivot axis 114, which pivot arms extend radially from the second pivot axis 114 in the direction of the first pivot axis 104 and pivotally mount the holding unit 80 about the first pivot axis 104, and have the possibility of pivoting the holding unit 80 about the first pivot axis 104 in a position-controlled or position-regulated manner.

For this purpose, pivot drives 146a, 146b are associated with the pivot arms 144a, 144b, which pivot drives enable an exact position-controlled or position-regulated pivoting of the holding unit 80 relative to the pivot arms 144a, 144b about the first pivot axis 104, by means of the machine control 140. A connection between the drive arms 143a, 143b and the pivot arms 144a, 144b is made by means of connecting arms 145a, 145b.

In order to improve the stability of the holding unit 80, in particular to improve the exact maintaining of the orientation of the holding unit 80 parallel to the first pivot axis 104, the pivoting carrier unit 112 is not only formed by the pivot arms 144a, 144b, but comprises an inherently rigid insert 148 extending between the pivot arms 144a, 144b, which insert not only positions the pivot arms 144a, 144b in a torsionally stiff manner with respect to one another, but also rotatably mounts the holding unit 80, in particular the holding rail 86, about the first pivot axis 104 on the inherently rigid insert 148 at a plurality of successive pivot bearing points 152 in the longitudinal direction 84, in order thereby to simultaneously improve the rigidity of the holding unit 80 as a whole against flexure transverse to the longitudinal direction 84, such that in particular the holding unit 80 behaves in a substantially flexure-free manner transverse to its longitudinal direction 84 during holding of the respective part to be bent B and positioning thereof, and thus also holds the part to be bent B in a substantially flexure-free manner due to the fixing on the holding unit 80 which occurs in a spaced manner over the whole extent of the part to be bent in the longitudinal direction 84.

Figure 9:
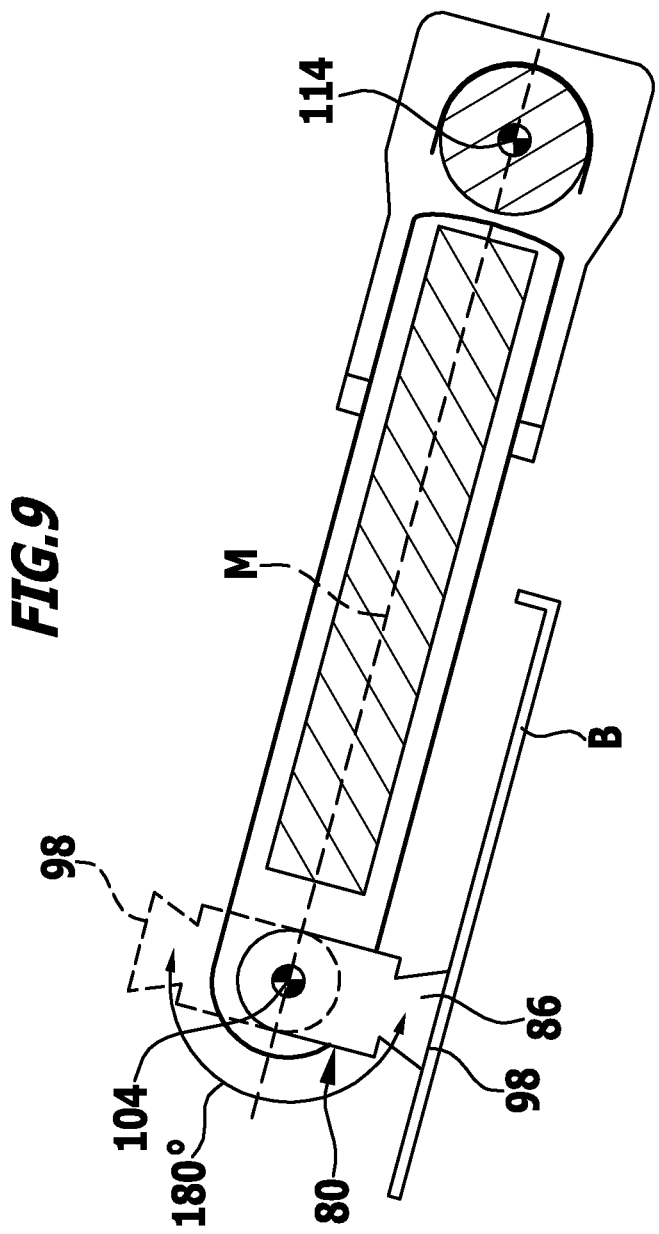
FIG. 9 is a cross section through the pivoting carrier unit having the holding unit with two positions of the holding unit rotated through 180° relative to one another.

Preferably, the spacing of the contact surfaces 98 of the holding unit 80 from the first pivot axis 104 is less than a third, more preferably less than a fifth of the spacing of the first pivot axis 104 from the second pivot axis 114, as shown enlarged in FIG. 9.

The spacing of the contact surface 98 from the first pivot axis 104 is, however, at least large enough that a part to be bent B abutting the holding surface 98 and pivotable by means of the holding unit 80 about a first pivot axis 104 can be pivoted in two positions in each of which the contact surfaces 98 of the holding unit 80 can be oriented parallel to the insertion plane E.

For example, this can be carried out in that, in these two positions, the contact surface 98 is parallel to a central plane M of the pivoting carrier unit 112 running through the pivot axes 104 and 114, such that a pivot movement about the first pivot axis 104 through at least 180° is possible without the part to be bent B colliding with the pivoting carrier unit 112, in particular with the inherently rigid frame 148, as shown in FIG. 9.

For this reason, the two positions of the holding unit 80 pivoted at 180° to one another are implemented by means of a sufficiently large spacing of the contact surface 98 from the first pivot axis 104, such that collisions with the pivoting carrier unit 112, in particular with the inherently-rigid insert 148, can be avoided.

Figure 10:
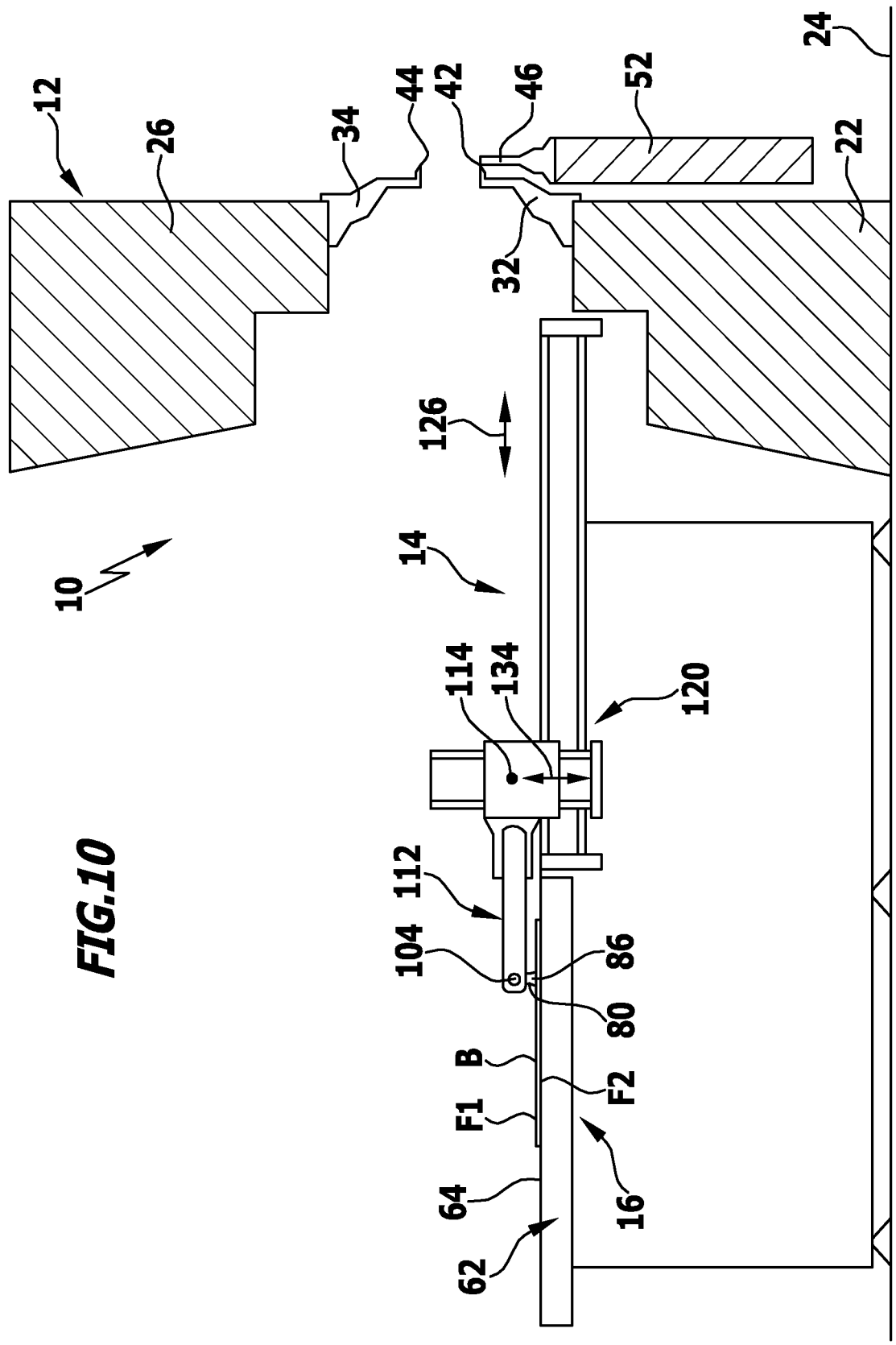
FIG. 10 is a view similar to FIG. 2 of the bending installation according to the invention when receiving a part to be bent in a bending receiving position.

The bending installation 10 according to the invention with the bending device 12, the handling device 14 and the loading device 15 operates as follows:

As shown in FIG. 10, a piece of flat material, for example, which represents an example of the initial shape of the part to be bent B, is placed on the loading device 16, namely the feed table 62 as already described, moved against the stop elements 66 into a receiving position for the part to be bent and thus positioned on the loading surface 64 in a position-defined manner in at least two spatial directions for receiving by the handling device 14.

In this position-defined bending receiving position, the holding unit 80 is then placed with the contact surface 98 on the gripping region EB of the first flat side F1 of the part to be bent B, controlled by the machine control 140, by moving the holding unit 80 for example by pivoting the holding unit 80 about the first pivot axis 104 and/or pivoting the pivoting carrier unit 112 about the second pivot axis 114, and/or moving the pivoting carrier base 116 by means of the carrier base moving unit 120, in particular by moving the base unit 122 in the feed direction 126 and/or moving the pivoting carrier base units 118a, 118b in the height positioning direction 134, while the part to be bent B bears with the flat side F2 on the loading surface 64 (FIG. 10).

By using the machine control 140 for controlling selective activation of at most those suction chambers 92, which bear on the flat side F1 of the part to be bent B, the part to be bent B is fixed on the holding unit 80 by the forces SK generated over the whole longitudinal extent of the holding unit 80 at the location of each suction chamber 92, and thus the part to be bent B is fixed on the holding unit 80 over the whole extent thereof in the longitudinal direction 84 in the gripping region EB of the part to be bent B.

Figure 11:
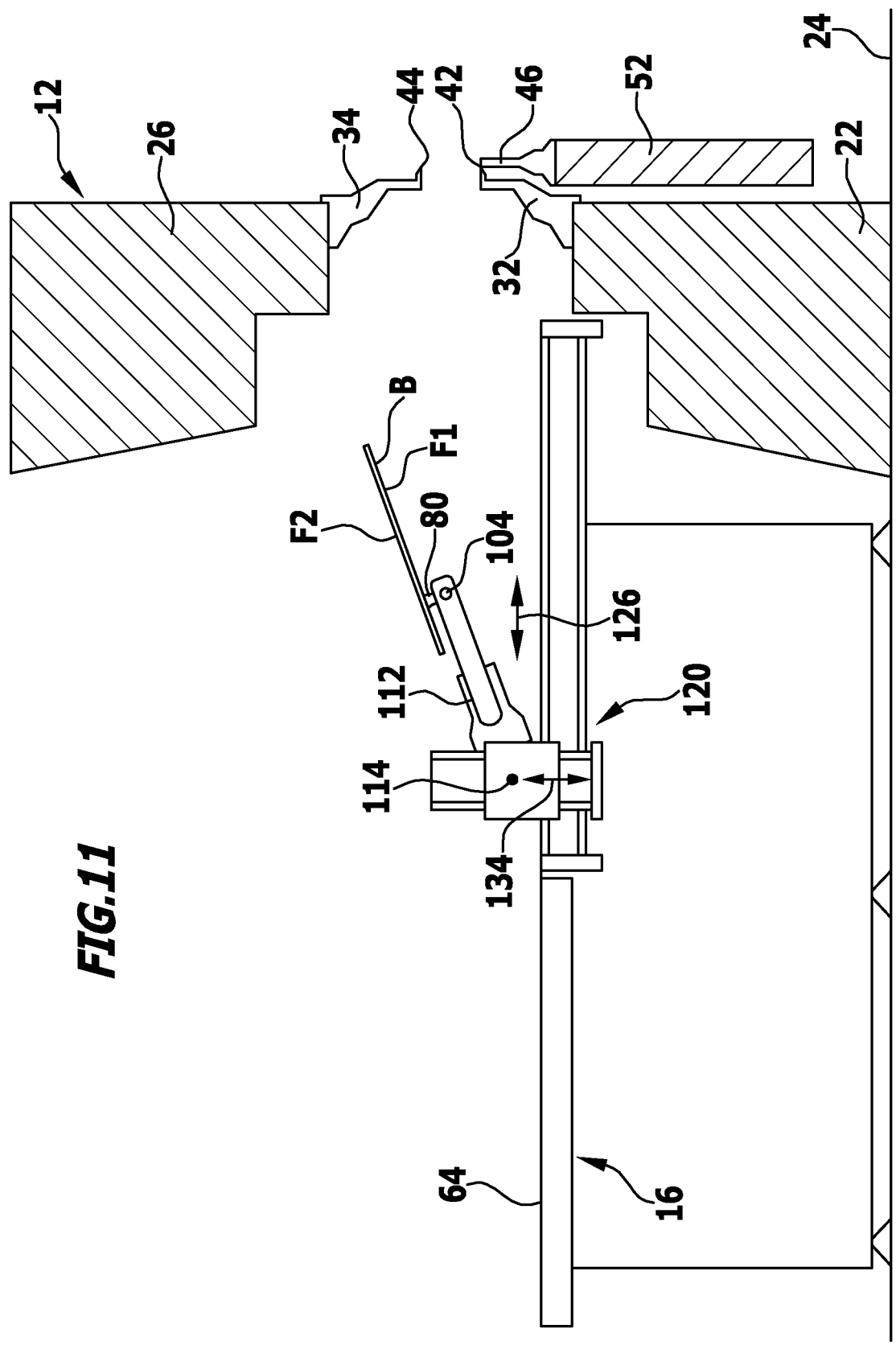
FIG. 11 is a view similar to FIG. 10 when moving the part to be bent between the bending receiving position and the bending insertion position.
Figure 12:
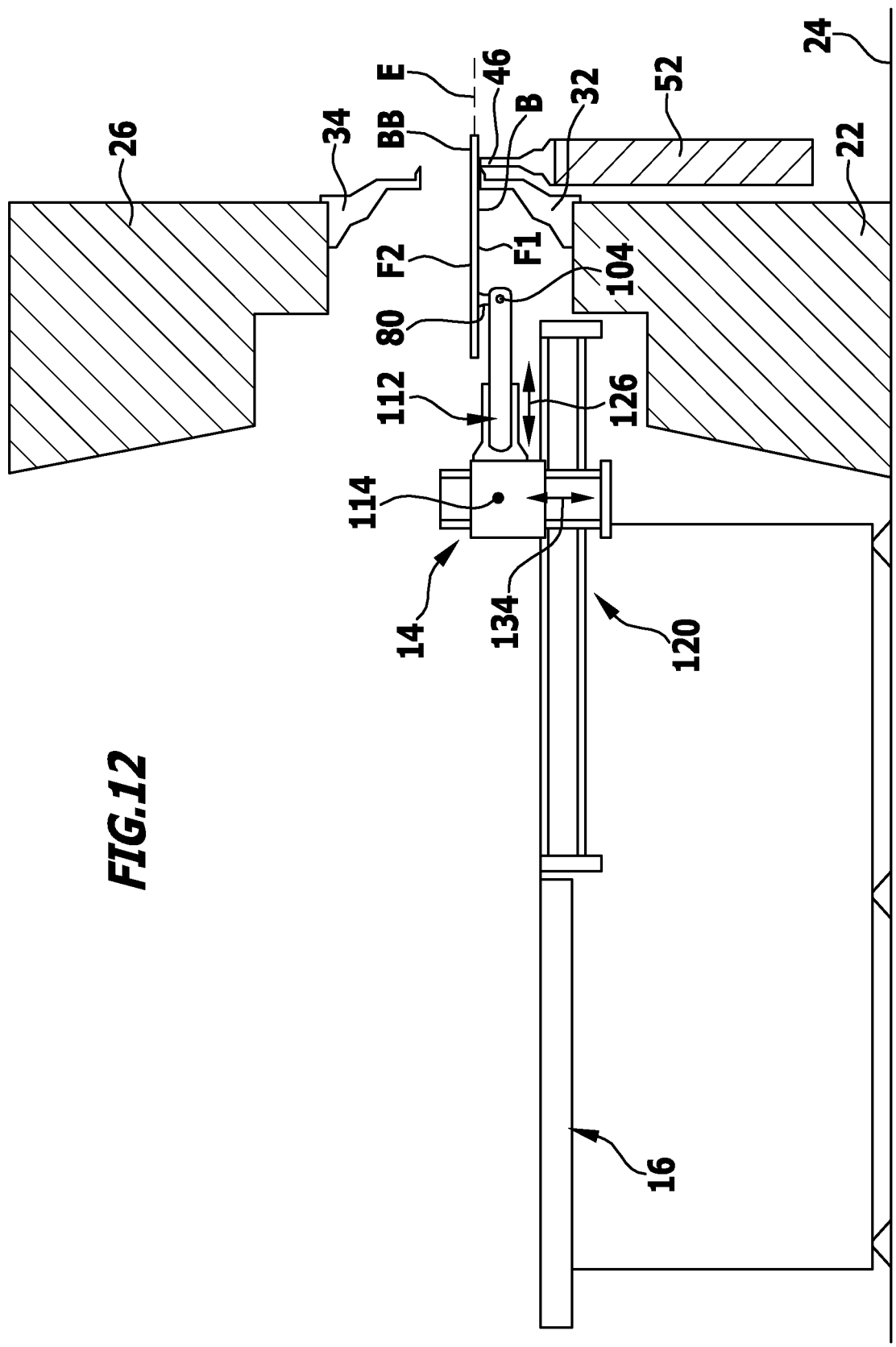
FIG. 12 is a view similar to FIG. 11 when inserting the part to be bent in the bending insertion position into the bending device.

The handling device 14 can, as shown in FIG. 11, controlled by the machine control 140, lift the part to be bent B from the loading surface 64, for example, by pivoting the pivoting carrier unit 112 about the second pivot axis 114 and/or moving the pivoting carrier base 116 by means of the carrier base moving unit 120, and move in the direction of the bending device 12, wherein when the part to be bent B is lifted from the loading surface 64 the base unit 122 is arranged on a side of the part to be bent B facing the bending device 12, as shown in FIG. 10, while in order to insert the part to be bent B in the bending device 12, the part to be bent B is moved away over the second pivot axis 114, such that, as shown in FIGS. 11 and 12, when the part to be bent B is inserted into the bending device 12, the part to be bent B is arranged on a side of the base unit 122 facing the bending device 12.

For inserting the part to be bent B between the clamping tools 32 and 34, it is not only necessary to pivot the pivoting carrier unit 112 about the second pivot axis 114, but also simultaneously necessary, by means of the carrier base moving unit 120 controlled by the machine control 140, on the one hand to move the base unit 122 in the feed direction 126 towards the clamping tools 32, 34, and on the other hand necessary to move the pivoting carrier base units 118 in the height positioning direction 134 such that a portion to be bent of the part to be bent B extends in the clamping plane E and can thus be placed on the clamping surface 36 of the lower clamping tool 32 in an orientation parallel to the clamping plane E, as shown in FIG. 12.

If the part to be bent B is orientated in the clamping plane E, then a closing of the clamping tools 32 and 34, also controlled by the machine control 140, occurs by moving the upper clamping tool 34 in the direction of the lower clamping tool 32, and thus a clamping of the part to be bent B between the clamping surfaces 36 and 38 of the clamping tools 32 or 34 also occurs.

In this clamped position of the part to be bent B, an exact positioning of the part to be bent B by the handling device 14 is not obligatory since the part to be bent B is fixed in a defined manner by the clamping tools 32 and 34.

Figure 13:
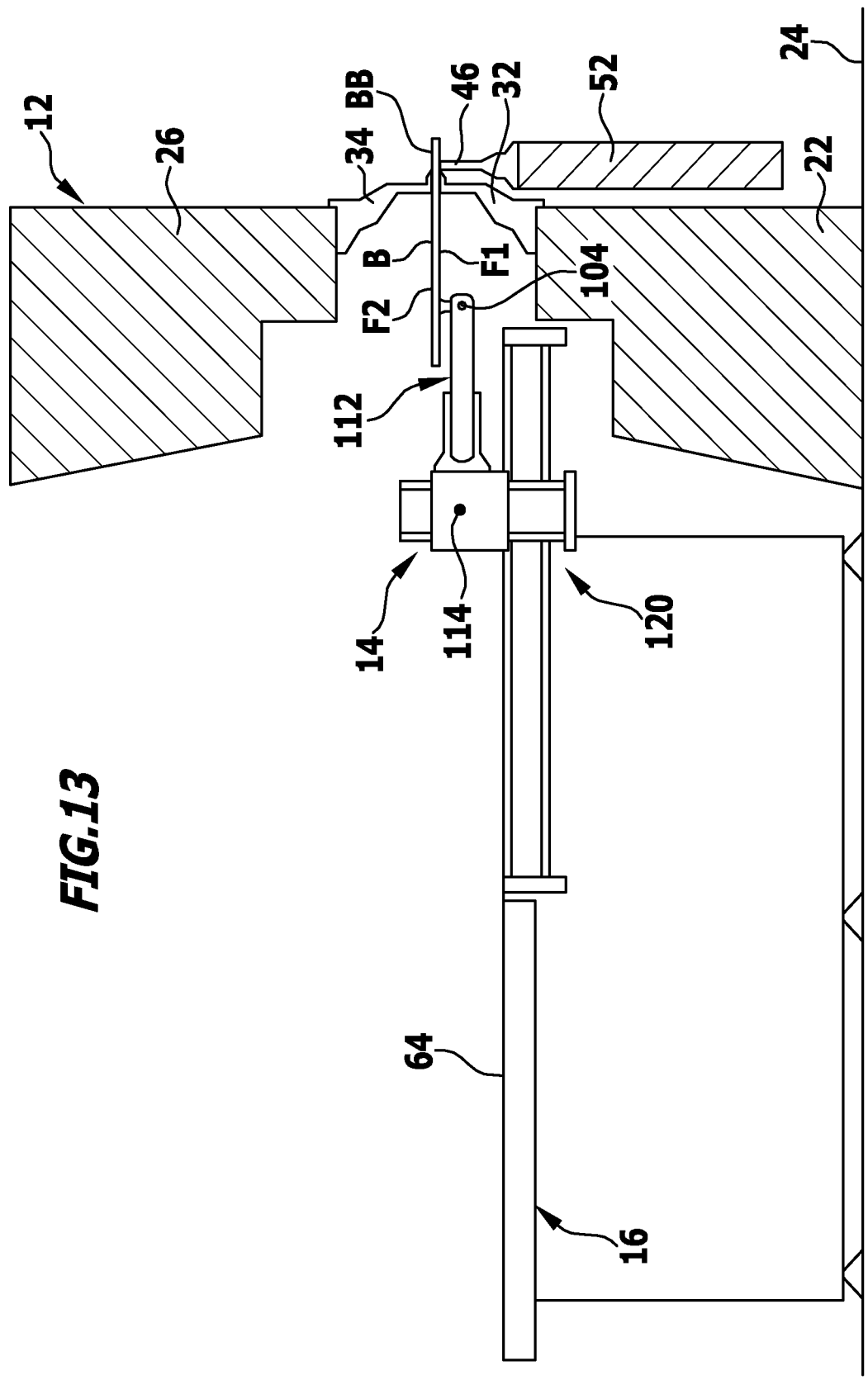
FIG. 13 is a view similar to FIG. 12 at the start of bending of the part to be bent in the bending device.
Figure 14:
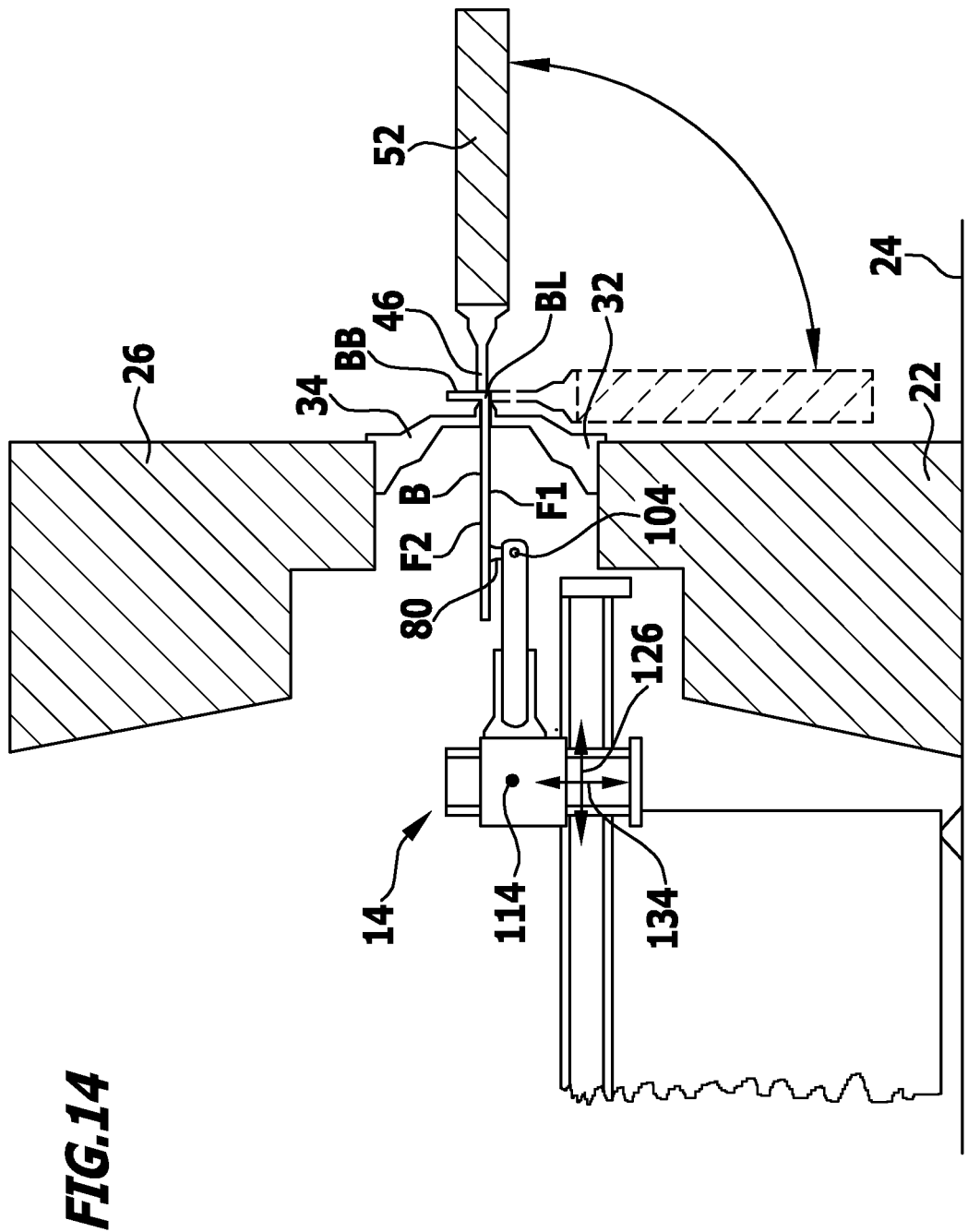
FIG. 14 is a view similar to FIG. 13 after bending of the part to be bent has been carried out.

As is shown from a comparison of FIGS. 13 and 14, bending of a bending region BB of the part to be bent B occurs in this position fixed by the clamping tools 32 and 34, by means of the bending tool 46, the bending region projecting over one of the bending edges 42, 44 of the clamping tools 32, 34, wherein for this purpose for example the bending tool 46, controlled by the machine control 140, is pivoted about the pivot axis 54 and thus a bend line BL is formed in the part to be bent B, and the bending edge 44 is bent.

Figure 15:
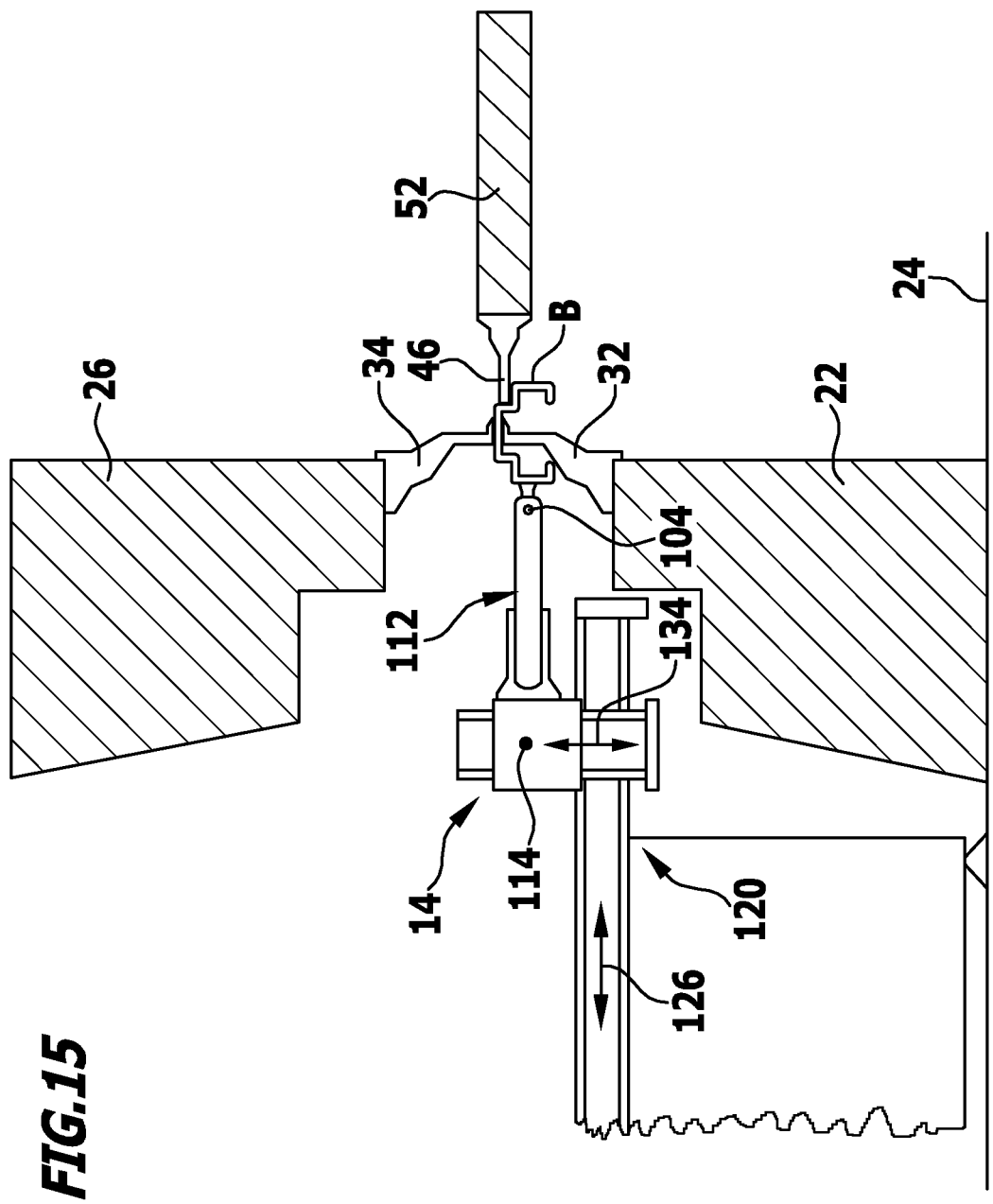
FIG. 15 is a view similar to FIG. 14 of a largely finished bent part to be bent in a position after final bending has been carried out.

By making further bends by producing further bend lines BL on one side or on both sides of the clamping region EB, the part to be bent B can be bent into the intended final state, as shown in FIG. 15, wherein in each case after each bend, the part to be bent B is released from the clamping tools 32, 34 by moving them away from one another, is gripped here by detecting the axis positions of the pivot axes 104 and 114 and the linear axes of the handling device 14, and is repositioned for carrying out the next respective bend by exact positioning of the part to be bent B relative to the bending edges 42, 44 by the handling device 14, and is clamped by the clamping tools.

Figure 16:
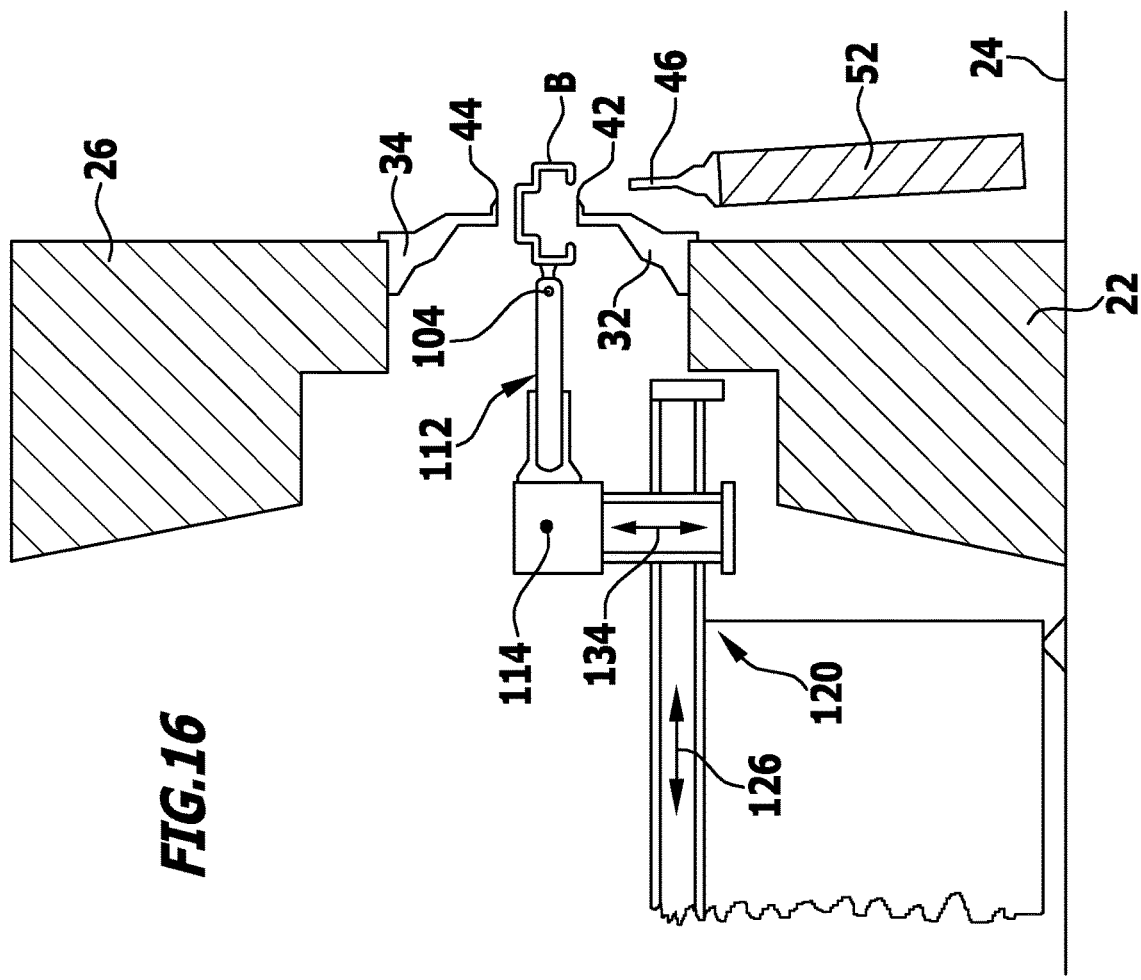
FIG. 16 is a view similar to FIG. 15 when removing the finished bent part to be bent from the bending device.
Figure 17:
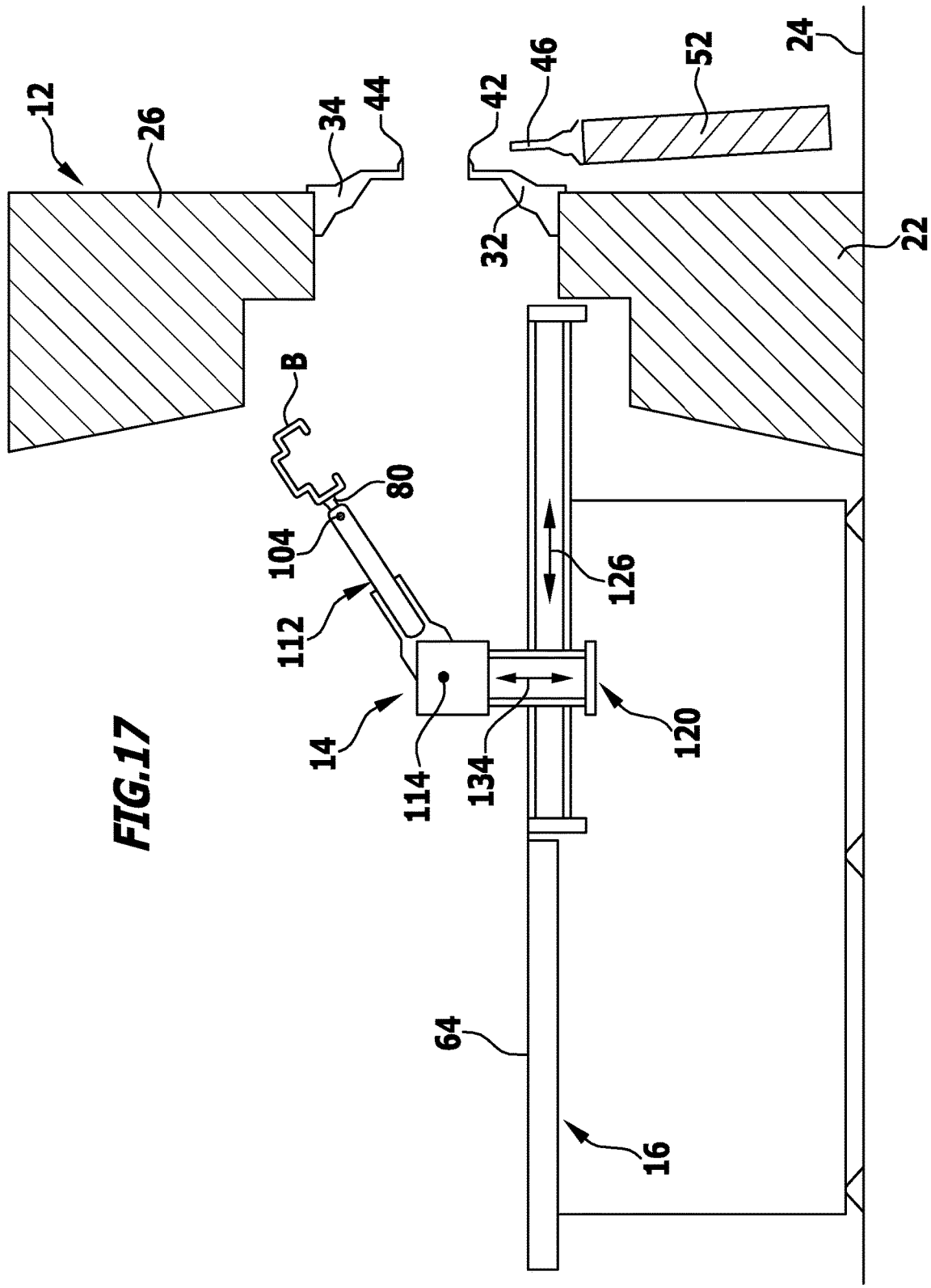
FIG. 17 is a view similar to FIG. 16 of a movement of the finished bent part to be bent out of the bending device in the direction of the loading device.
Figure 18:
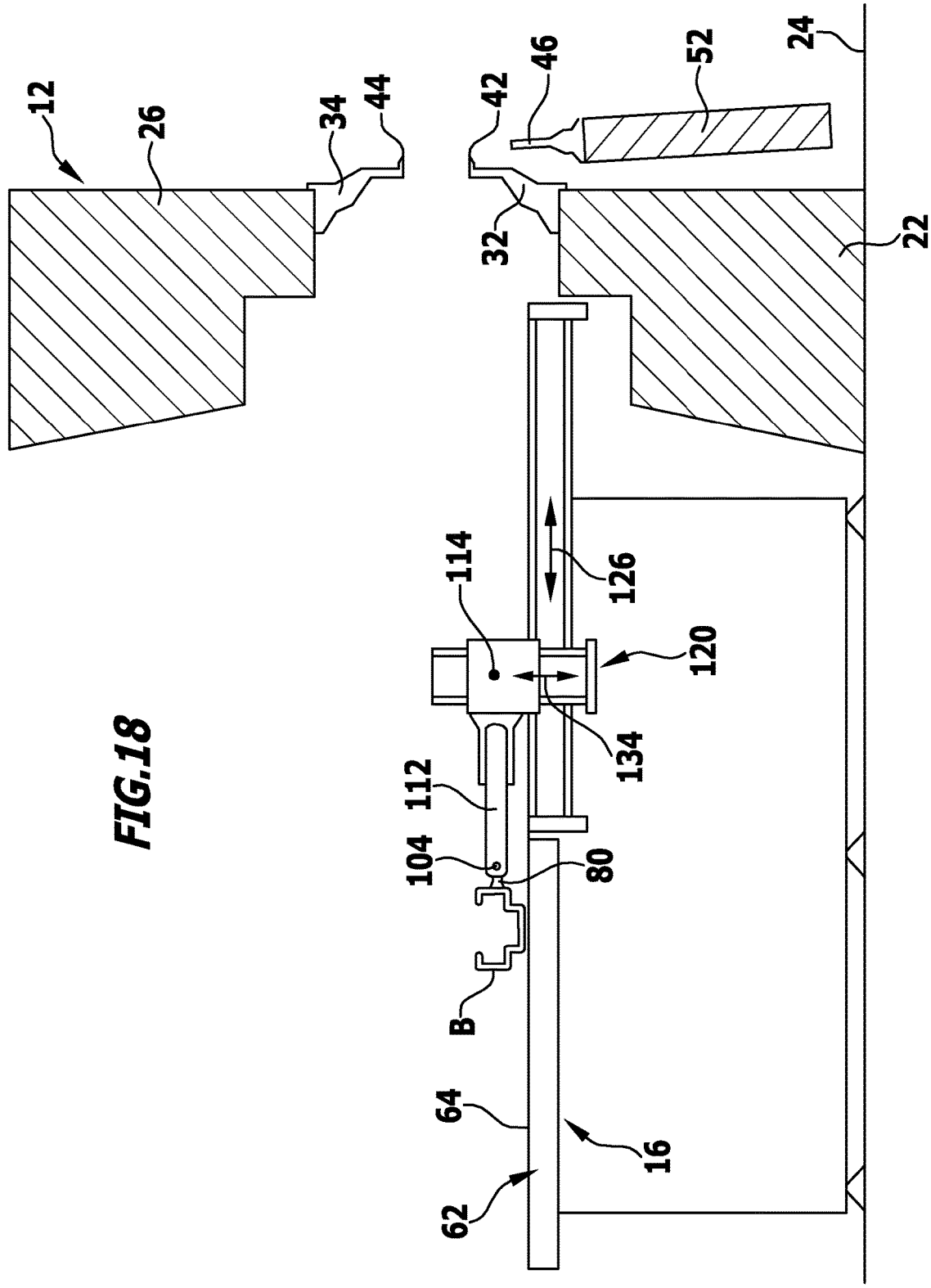
FIG. 18 is a view similar to FIG. 17 when depositing the finished bent part to be bent on the loading device.

After completion of the individual bending processes, the part to be bent B is moved out of the bending device 12, as shown in FIGS. 16 and 17, and moved to the loading device 16 by a pivoting of the pivoting carrier unit 112 of the handling device 14, in particular about the second pivot axis 114 (FIG. 18), and is received by said loading device or by a specially provided transport device.

By the fact that the part to be bent B in the loading device 16 is gripped and fixed once in a gripping region EB by means of the holding unit 80, and is inserted in the bending device 12 for various bending processes, in particular without releasing the gripping region EB from the holding unit 80, the possibility exists of performing different bending processes on the part to be bent B one after the other with the highest precision and reliability, as well as at high speed, for a part to be bent B held on one side by the holding unit 80, without releasing the gripping region EB from the holding unit 80 and without repositioning the part to be bent B for a new grip, and of bending this part to be bent B into the final shape in which the part to be bent B is for example an open shape, in particular open on one side.

Figure 19:
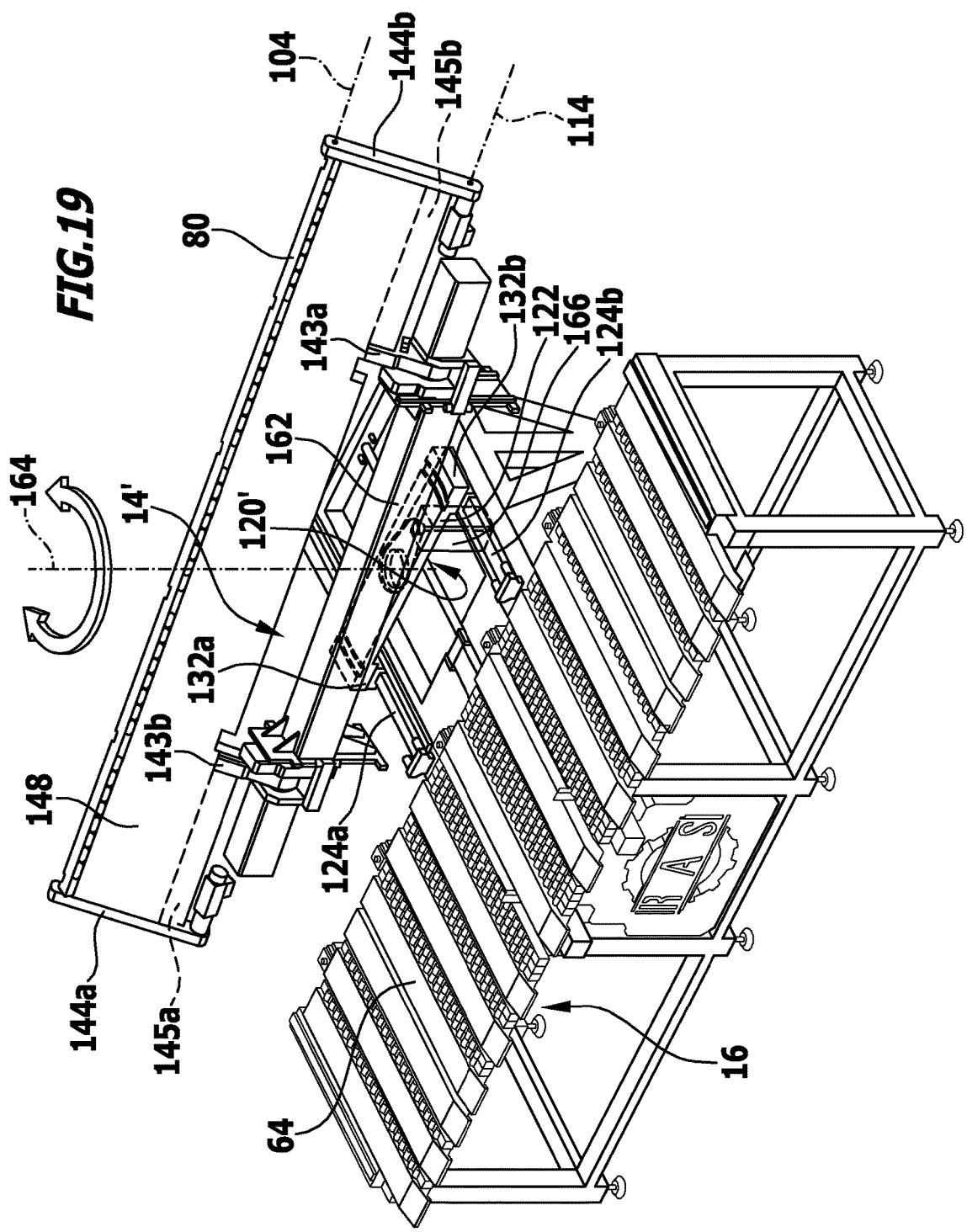
FIG. 19 is a view similar to FIG. 7 of a second embodiment of a handling device according to the invention.

In a second embodiment of a handling device 14' according to the invention, shown in FIG. 19, the carrier base moving unit 120' is constructed such that the two guide carriages 132*a*, 132*b* guided on the linear guides 124*a*, 124*b* are connected to one another by a cross member 162, on which in turn the base unit 122 is rotatably mounted about a rotation axis 164 and is rotated by a position-controlled or position-regulated rotary drive 166 on the part of the machine control 140, wherein the rotation axis 164 runs transversely to the second pivot axis 114.

Furthermore, the rotation axis 164 runs preferably perpendicular to the insertion plane E.

Thus the possibility exists of orienting or if necessary readjusting the whole pivoting carrier unit 112 parallel to the respective bending edge 42, 44 when inserting the part to be bent B.

Furthermore, the rotation axis 164 also runs preferably perpendicular to the loading surface 64, such that the possibility also exists of gripping a part to be bent B located on the loading surface 64 in a defined orientation and optionally deviating from the orientation of the stop elements 66 with the holding unit 80, the part to be bent for example not being orientated by the stop elements 66 in a defined manner in two spatial directions, but its position for example being determined by measuring.

In addition, the second embodiment is designed and constructed in the same way as the first embodiment, such that the same reference numerals are used and furthermore full reference can be made to the explanations of the first embodiment.

Figure 20:
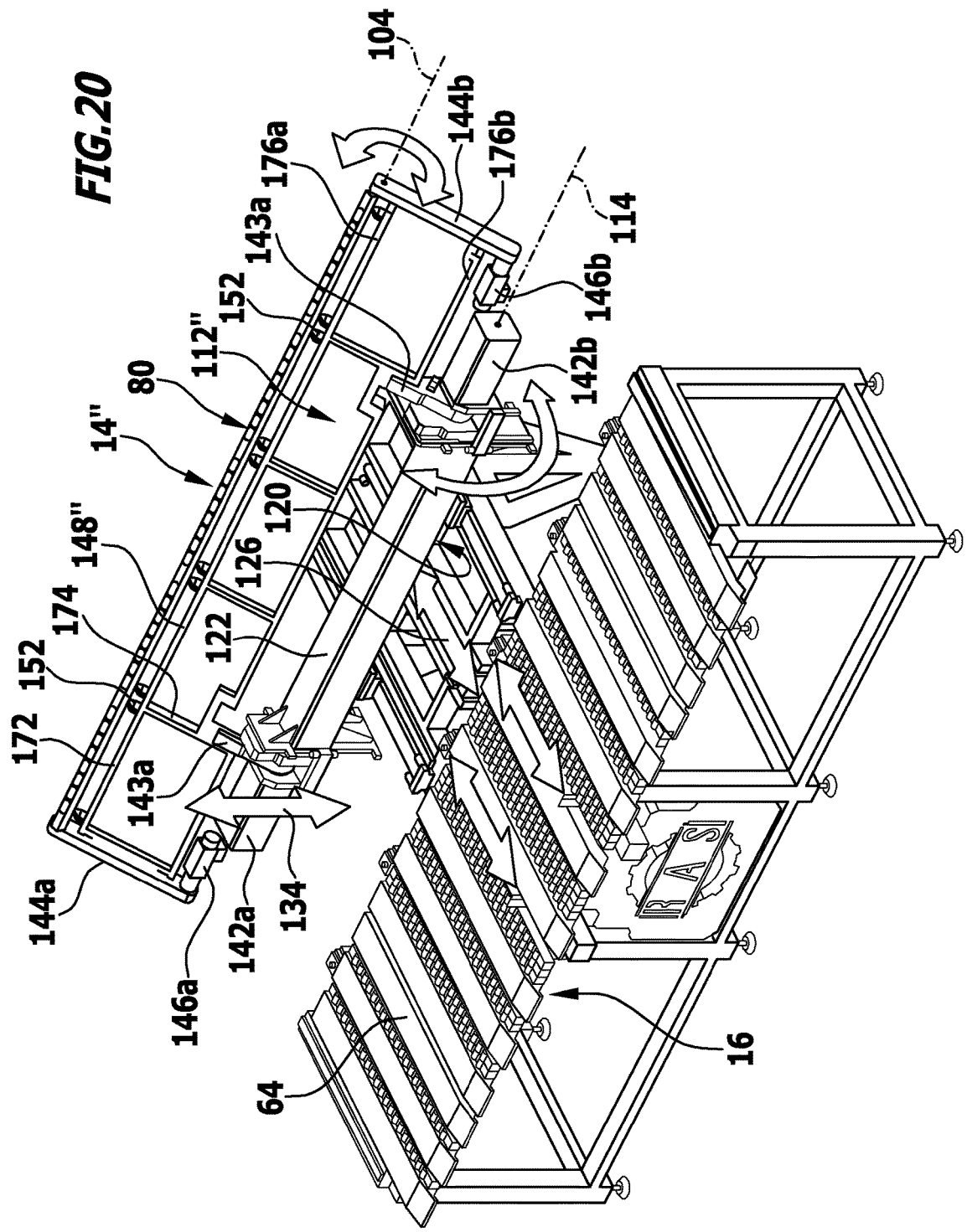
FIG. 20 is a view similar to FIG. 7 of a third embodiment of a handling device according to the invention.
Figure 21:
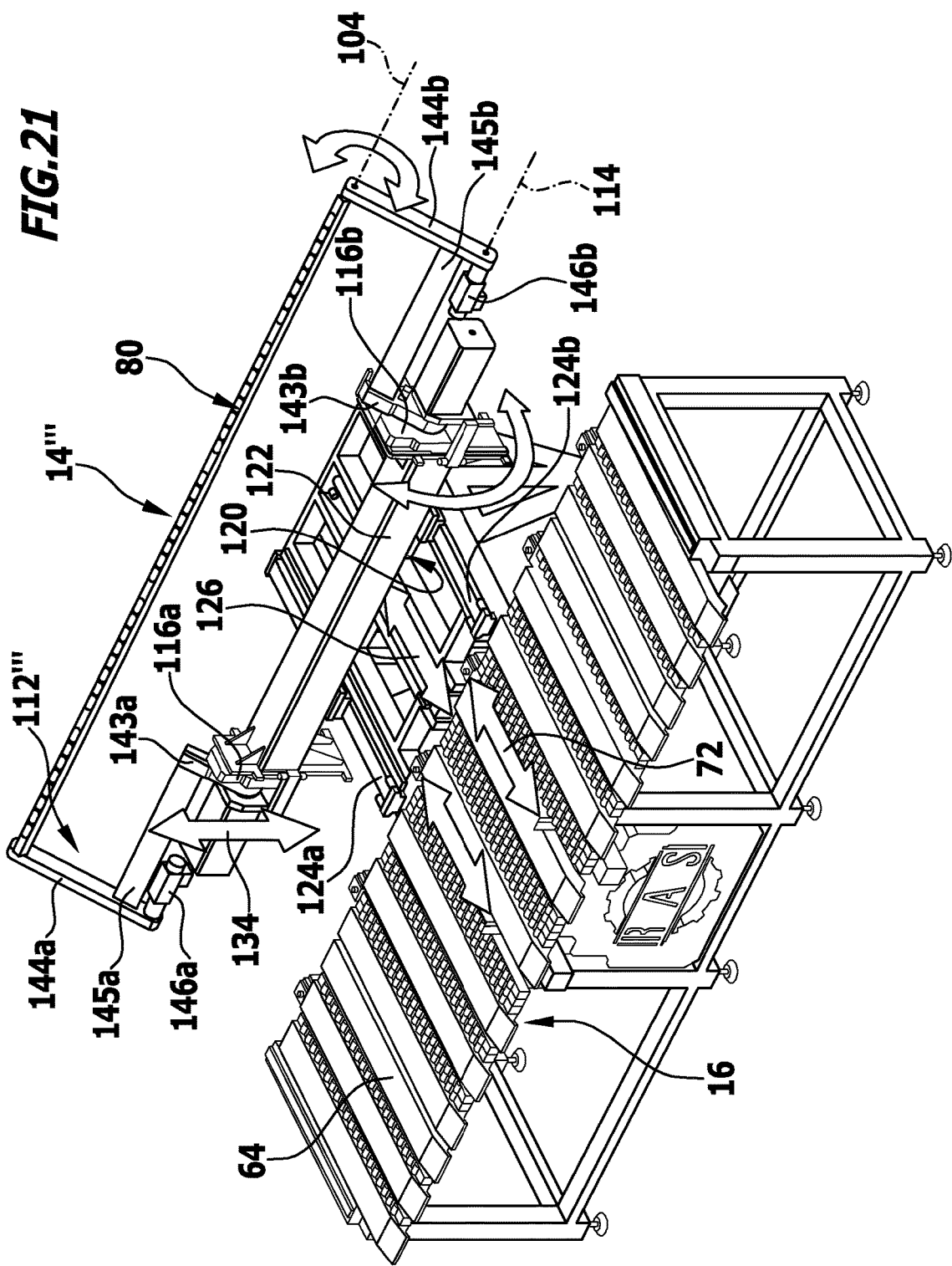
FIG. 21 is a view similar to FIG. 7 of a fourth embodiment of a handling device according to the invention.

In a third embodiment of a handling device 14" according to the invention, shown in FIG. 20, the pivoting carrier unit 112" comprises the outer pivot arms 144*a*, 144*b*, and the inherently rigid insert 148" arranged between these is constructed as a ladder construction or frame construction 172 which comprises struts 174 running radially to the second pivot axis 114 and to the first pivot axis 104 and struts 176*a*, 176*b* running parallel to the pivot axes 114, 104, which struts are connected rigidly to one another and also rigidly to the drive arms 143*a*, 143*b* as well as to the pivot arms 144*a*, 144*b*.

Here, for example, the strut 176*a* running parallel to the holding unit 80 and arranged facing the first pivot axis 104 holds the pivot bearing points 152, by means of which the holding unit 80 is rotatably held on the insert 148" multiple times about the first axis 104, while the strut 176*b* arranged facing the second pivot axis 114 replaces the connecting arms 145*a*, 145*b*.

In addition, the third embodiment of the handling device 14" according to the invention is constructed in the same way as the first or also where appropriate the second embodiment, such that full reference can be made to the explanations of these embodiments with regard to the description of the further elements.

In a fourth embodiment of a handling device 14''' according to the invention, the pivoting carrier unit 112''' only comprises the two pivot arms, 144*a*, 144*b* between which the holding unit 80 extends in a self-supporting manner, if it is constructed sufficiently rigidly, such that the holding unit 80 with the part to be bent fixed thereto can be pivoted through 360° about the first pivot axis 104 relative to the pivot arms 144*a*, 144*b*, since there is no insert 148 which would prevent a pivot movement of this type.

In this case, the pivot bearing points 152 between the pivot arms 144*a*, 144*b* are also omitted, such that the holding unit 80 is pivotally mounted only on the pivot arms 144*a* and 144*b* and extends in a self-supporting manner between them.

In this embodiment, the pivot arms 144*a* and 144*b* are connected to the drive arms 143*a*, 143*b* via connecting arms 145*a* and 145*b*, but there are no further structures stabilising the pivot arms 144*a* and 144*b* relative to one another between these pivot arms.

In addition, the fourth embodiment of the handling device according to the invention is also constructed in the same way as the preceding embodiments, such that the same reference numerals are used for the same inserts, and full reference can be made to the explanations of the preceding embodiments with regard to the description thereof.

Figure 22:
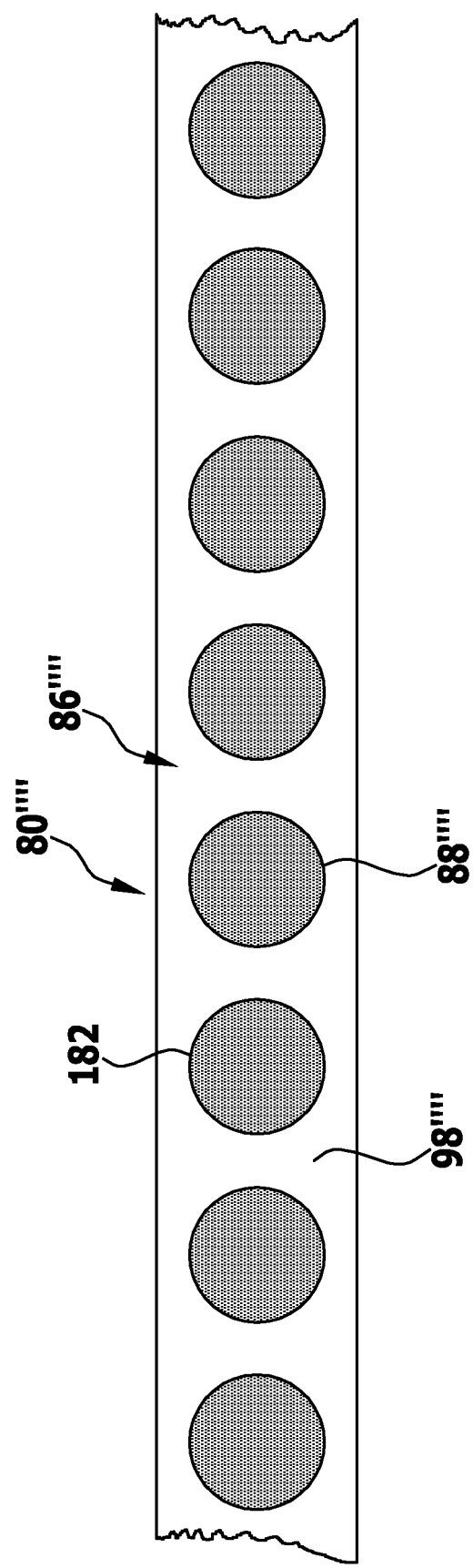
FIG. 22 is a view similar to FIG. 6 of a holding unit in a fifth embodiment of a handling device according to the invention.
Figure 23:
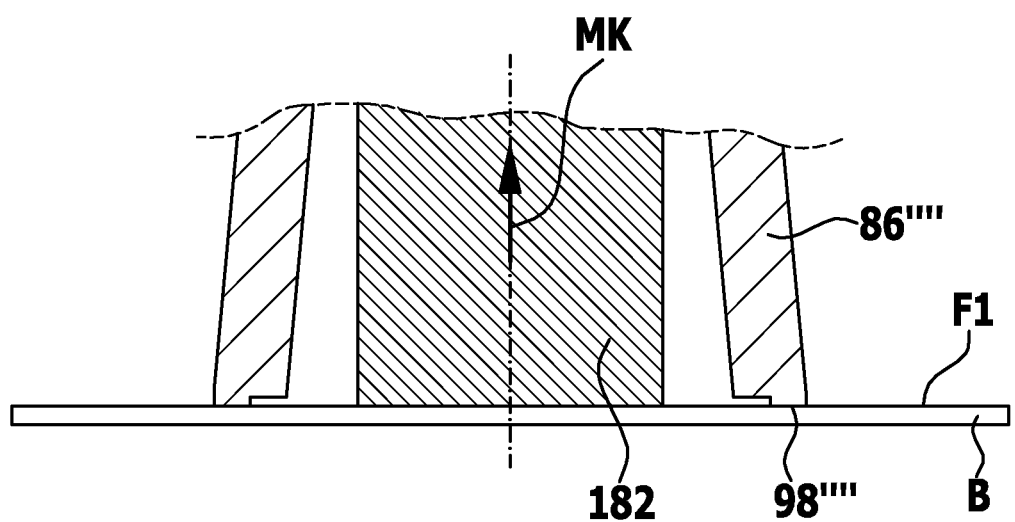
FIG. 23 is a section similar to FIG. 5 through the holding unit in accordance with FIG. 22.

In a fifth embodiment of a handling device 14″″ according to the invention, the holding unit 80″″ only represented in FIGS. 22 and 23 is constructed, such that the holding rail 86 is not provided with holding elements 88 having suction chambers 92, but rather with holding elements 88″″ which have magnets 182, such that, with the magnets 182, it is possible to grip a magnetisable part to be bent B in a one-sided manner on a flat side F1 and to then apply this part to be bent B, by means of magnetic forces MK, against the contact surface 98″″ in a force-actuated manner.

In addition, all further inserts of the fifth embodiment of the handling device according to the invention are identical to those of the first four embodiments, such that the same reference numerals are used for the same parts, and furthermore full reference can also be made to the description of these embodiments.

In a further embodiment not shown in detail in the drawings, it is also conceivable to use both suction chambers 92 and magnets 182 for the holding elements 88.

The invention claimed is:

1. Handling device for inserting parts to be bent into a bending device for the bending thereof about at least one bending edge, the handling device has a holding unit which is formed to be elongate in a longitudinal direction and has at least one holding element with which the part to be bent, which is to be received and is arranged on a loading surface, is grippable on one of its flat sides by forces of attraction on one side of the flat side at a plurality of successive locations in the longitudinal direction, the holding unit being pivotable relative to a pivoting carrier unit about a first pivot axis parallel to the longitudinal direction, the pivoting carrier unit is pivotable relative to a pivoting carrier base about a second pivot axis which extends parallel to the first pivot axis, the pivoting carrier unit has at least two pivot arms extending to the first pivot axis, the at least two pivot arms are in spaced relation to define a longitudinal span with the at least one holding element being arranged longitudinally within said longitudinal span of the at least two pivot arms, the pivoting carrier base is movable by means of a carrier base moving unit in a direction transverse to the second pivot axis, and, with the handling device, the part to be bent is movable between a receiving position for the part to be bent on the loading surface and a bending device insertion position for the part to be bent.

2. Handling device according to claim 1, wherein the holding unit supports the part to be bent, which is to be received, on the flat side at a plurality of successive locations in the longitudinal direction, wherein the holding unit has a contact surface extending in the form of a strip in the longitudinal direction.

3. Handling device according to claim 1, characterised in that the holding unit has a contact surface which is arranged to be applied to the flat side of the part to be bent, which is to be received, the contact surface having a spacing from the first pivot axis which is a fraction of the spacing of the first pivot axis from the second pivot axis.

4. Handling device according to claim 1, wherein the holding unit is pivotable about the first pivot axis such that a contact surface thereof is orientatable in two positions pivoted at approximately 180° to one another in each case parallel to a central plane of the pivoting carrier unit.

5. Handling device according to claim 1, wherein the holding unit is positionable within a predetermined angle range in any rotational position about the first pivot axis in a position-controlled or position-regulated manner.

6. Handling device according to claim 1, wherein the at least one holding element comprises a plurality of holding elements arranged successively in the longitudinal direction.

7. Handling device according to claim 6, wherein the plurality of holding elements are individually acitvatable or deactivatable.

8. Handling device according to claim 6, wherein a multiple of the plurality of holding elements of the holding unit is contained longitudinally within a longitudinal span of two outermost members of the at least two pivot arms.

9. Handling device according to claim 8, wherein all of the holding elements of the holding unit are contained longitudinally within the longitudinal span of the two outermost members.

10. Handling device according to claim 1, wherein the at least one holding element acts on the flat side of the part to be bent with magnetic forces.

11. Handling device according to claim 1, wherein the at least one holding element acts on the flat side with pneumatic suction forces.

12. Handling device according to claim 11, wherein the at least one holding element has at least one suction chamber.

13. Handling device according to claim 1, wherein the pivoting carrier unit has at least two pivot arms extending to the first pivot axis.

14. Handling device according to claim 13, wherein the pivot arms are rigidly connected to one another.

15. Handling device according to claim 14, wherein the pivot arms are connected to one another by an insert extending therebetween.

16. Handling device according to claim 15, wherein the insert is constructed as a rigid frame.

17. Handling device according to claim 15, wherein the holding unit is pivotally mounted on the insert about the first pivot axis by means of a plurality of pivot bearing points arranged successively in the longitudinal direction.

18. Handling device according to claim 1, wherein the movement of the pivoting carrier base is achievable in a position-controlled or position-regulated manner by means of the carrier base moving unit, using a machine control.

19. Handling device according to claim 1, wherein at least one movement with a component in the direction parallel to an insertion plane of the bending device is achievable by means of the carrier base moving unit.

20. Handling device according to claim 1, wherein at least one movement with a component in the direction transverse to an insertion place of the bending device is achievable by means of the carrier base moving unit.

21. Handling device according to claim 1, wherein the carrier base moving unit is configured such that therewith at least one linear movement is achievable transversely to the bending edge.

22. Handling device according to claim 1, wherein the carrier base moving unit comprises at least one linear guide having a guide carriage.

23. Handling device according to claim 1, wherein the carrier base moving unit comprises at least one further linear guide having a carriage unit.

24. Handling device according to claim 1, wherein the carrier base moving unit comprises a rotation axis running transversely to the second pivot axis, about which the pivoting carrier base is rotatable.

25. Handling device according to claim 24, wherein the rotation axis runs perpendicular to an insertion plane of the bending device.

26. Handling device according to claim 1, wherein the pivot carrier unit rotatably mounts the holding unit about the first pivot axis defined by a plurality of successive pivot bearing points arranged along the longitudinal direction.

27. Handling device of claim 26, wherein the at least two pivot arms are rigidly connected to one another.

28. Handling device according to claim 26, wherein the successive pivot bearing points are spaced from each of the at least two pivot arms.

29. Bending installation comprising a bending device, a loading device and a handling device, for inserting parts to be bent into a bending device for the bending thereof about at least one bending edge, the handling device has a holding unit which is formed to be elongate in a longitudinal direction and has at least one holding element with which the part to be bent, which is to be received and is arranged on a loading surface, is grippable on one of its flat sides by forces of attraction on one side of the flat side at a plurality of successive locations in the longitudinal direction, the holding unit being pivotable relative to a pivoting carrier unit about a first pivot axis parallel to the longitudinal direction, the pivoting carrier unit is pivotable relative to a pivoting carrier base about a second pivot axis which extends parallel to the first pivot axis, the pivoting carrier unit has at least two pivot arms extending to the first pivot axis, the at least two pivot arms are in spaced relation to define a longitudinal span with the at least one holding element being arranged longitudinally within said longitudinal span of the at least two pivot arms, the pivoting carrier base is movable by means of a carrier base moving unit in a direction transverse to the second pivot axis, and, with the handling device, the part to be bent is movable between a receiving position for the part to be bent on the loading surface and a bending device insertion position for the part to be bent, by means of which handling device, the part to be bent is received by the loading device and the received part to be bent is inserted multiple times in the bending device in order to bend a portion of the part to be bent.

30. Bending installation according to claim 29, wherein the bending device has two clamping tools and a bending tool which is movable relative to the clamping tools in order to bend.

31. Bending installation according to claim 29, wherein bending of the portions of the part to be bent in two opposing bending directions is possible by means of the bending device.

32. Bending installation according to claim 29, wherein the clamping tools define a clamping plane with their clamping surfaces.

33. Bending installation according to claim 29, wherein the bending device is configured as a pivoting bending device.

34. Bending installation according to claim 29, wherein the loading surface is formed by a feed table of the loading device.

35. Bending installation according to claim 34, wherein the feed table has stop elements for a blank part to be bent to be fed.

36. Bending installation according to claim 29, wherein the part to be bent is positionable on the loading surface in at least two spatial directions.

37. Handling device according to claim 29, wherein the pivot carrier unit rotatably mounts the holding unit about the first pivot axis defined by a plurality of successive pivot bearing points arranged along the longitudinal direction.

38. Handling device of claim 37, wherein the at least two pivot arms are rigidly connected to one another.

39. Handling device according to claim 37, wherein the successive pivot bearing points are spaced from each of the at least two pivot arms.

40. Handling device according to claim 29, wherein the at least one holding element comprises a plurality of holding elements arranged successively in the longitudinal direction, wherein a multiple of the plurality of holding elements of the holding unit is contained longitudinally within a longitudinal span of two outermost members of the at least two pivot arms.

41. Handling device according to claim 40, wherein all of the holding elements of the holding unit are contained longitudinally within the longitudinal span of the two outermost members.

* * * * *